United States Patent
Kallesøe et al.

(10) Patent No.: US 11,365,891 B2
(45) Date of Patent: Jun. 21, 2022

(54) METHOD AND SYSTEM FOR BALANCING A HEATING SYSTEM

(71) Applicant: Grundfos Holding A/S, Bjerringbro (DK)

(72) Inventors: Carsten Skovmose Kallesøe, Viborg (DK); René Stig Bergqvist, Regstrup (DK); Lars Sund Mortensen, Aars (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 670 days.

(21) Appl. No.: 15/532,278

(22) PCT Filed: Mar. 10, 2015

(86) PCT No.: PCT/EP2015/054983
§ 371 (c)(1),
(2) Date: Jun. 1, 2017

(87) PCT Pub. No.: WO2016/087057
PCT Pub. Date: Jun. 9, 2016

(65) Prior Publication Data
US 2017/0328579 A1    Nov. 16, 2017

(30) Foreign Application Priority Data
Dec. 3, 2014    (WO) .................. PCT/EP2014/076416

(51) Int. Cl.
*F24D 19/10*    (2006.01)
*F04D 15/00*    (2006.01)
(Continued)

(52) U.S. Cl.
CPC ..... *F24D 19/1012* (2013.01); *F04D 13/0686* (2013.01); *F04D 15/0066* (2013.01);
(Continued)

(58) Field of Classification Search
CPC .... F24D 19/1012; F24D 3/10; F24D 19/1015; F24D 19/1024; F24D 19/1048;
(Continued)

(56) References Cited

U.S. PATENT DOCUMENTS

| 8,024,161 | B2 | 9/2011 | Pekar et al. |
| 8,109,906 | B2 * | 2/2012 | Smisson, III ........... A61M 5/36 604/122 |
| 9,766,633 | B2 * | 9/2017 | Lederle ................ G05D 7/0617 |
| 2004/0000155 | A1 * | 1/2004 | Cline ..................... F24F 3/065 62/175 |
| 2005/0129535 | A1 | 6/2005 | Beyer et al. |
| 2014/0074730 | A1 * | 3/2014 | Arensmeier ............ F24F 11/30 705/305 |

FOREIGN PATENT DOCUMENTS

| DE | 35 29 256 A1 | 2/1987 |
| DE | 35 29 257 A1 | 2/1987 |

(Continued)

*Primary Examiner* — Kamini S Shah
*Assistant Examiner* — John E Johansen
(74) *Attorney, Agent, or Firm* — McGlew and Tuttle, P.C.

(57) ABSTRACT

A method of balancing a heating system with a flow system, including a supply flow line (60) and a return flow line (70), a heat source (55) and a pump (10) hydraulic lines ($L_1$-$L_n$), some having a heating element ($H_1$-$H_n$) with a balancing valve ($V_1$-$V_n$). The method includes: carrying out one or more measurements by opening one hydraulic line only and determining a flow rate through the pump and a pressure difference across the pump, establishing a hydraulic model based on the determined flow rate and pressure difference from at least two measurements from step, and at least one additional measurement for at least two hydraulic lines, specifying a desired flow rate for each of the hydraulic lines, and adjusting one or more of the dedicated balancing valves in order to meet the desired flow rate for each of the hydraulic lines by using the hydraulic model.

29 Claims, 8 Drawing Sheets

(51) Int. Cl.
*F24D 3/10* (2006.01)
*F04D 13/06* (2006.01)
*H04Q 9/00* (2006.01)

(52) U.S. Cl.
CPC ........... *F04D 15/0088* (2013.01); *F24D 3/10* (2013.01); *F24D 19/1015* (2013.01); *F24D 19/1024* (2013.01); *F24D 19/1048* (2013.01); *H04Q 9/00* (2013.01); *H04Q 2209/00* (2013.01); *H04Q 2209/40* (2013.01); *Y02B 30/70* (2013.01)

(58) Field of Classification Search
CPC ............ F04D 13/0686; F04D 15/0066; F04D 15/0088; Y02B 30/745; Y02B 30/70; H04Q 9/00; H04Q 2209/00; H04Q 2209/40
USPC ............................................................ 703/9
See application file for complete search history.

(56) References Cited

FOREIGN PATENT DOCUMENTS

| | | | | |
|---|---|---|---|---|
| DE | 3529256 A1 | * | 2/1987 | ............... F24D 3/02 |
| DE | 69706458 T2 | * | 4/2002 | ............... F17D 1/14 |
| EP | 0 355 255 A2 | | 2/1990 | |
| EP | 0 795 724 A1 | | 9/1997 | |
| EP | 1 146 231 A2 | | 10/2001 | |
| EP | 2 085 707 A2 | | 8/2009 | |
| EP | 2 573 403 A1 | | 3/2013 | |
| EP | 2 696 175 A1 | | 2/2014 | |
| EP | 2 728 269 A1 | | 5/2014 | |
| EP | 2728269 A1 | * | 5/2014 | ......... F24D 19/1012 |
| EP | 2 778 423 A1 | | 9/2014 | |
| FR | 2711775 B1 | * | 2/1996 | ......... F24D 19/1015 |
| WO | 2014/094991 A1 | | 6/2014 | |

* cited by examiner

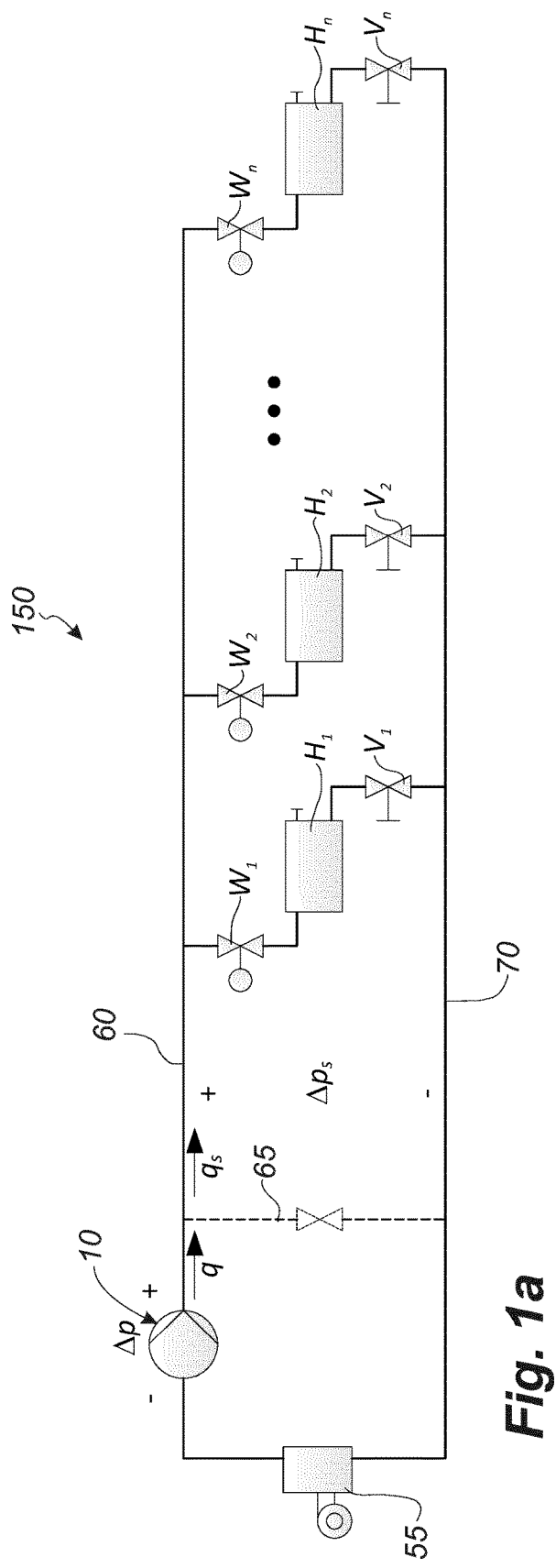
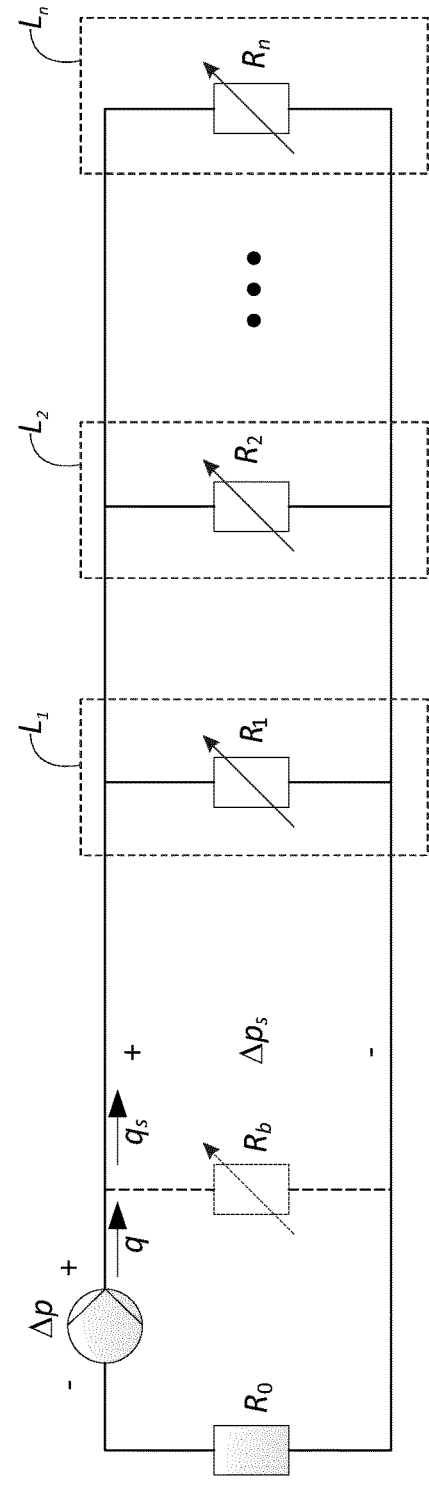
Fig. 1a
Fig. 1b

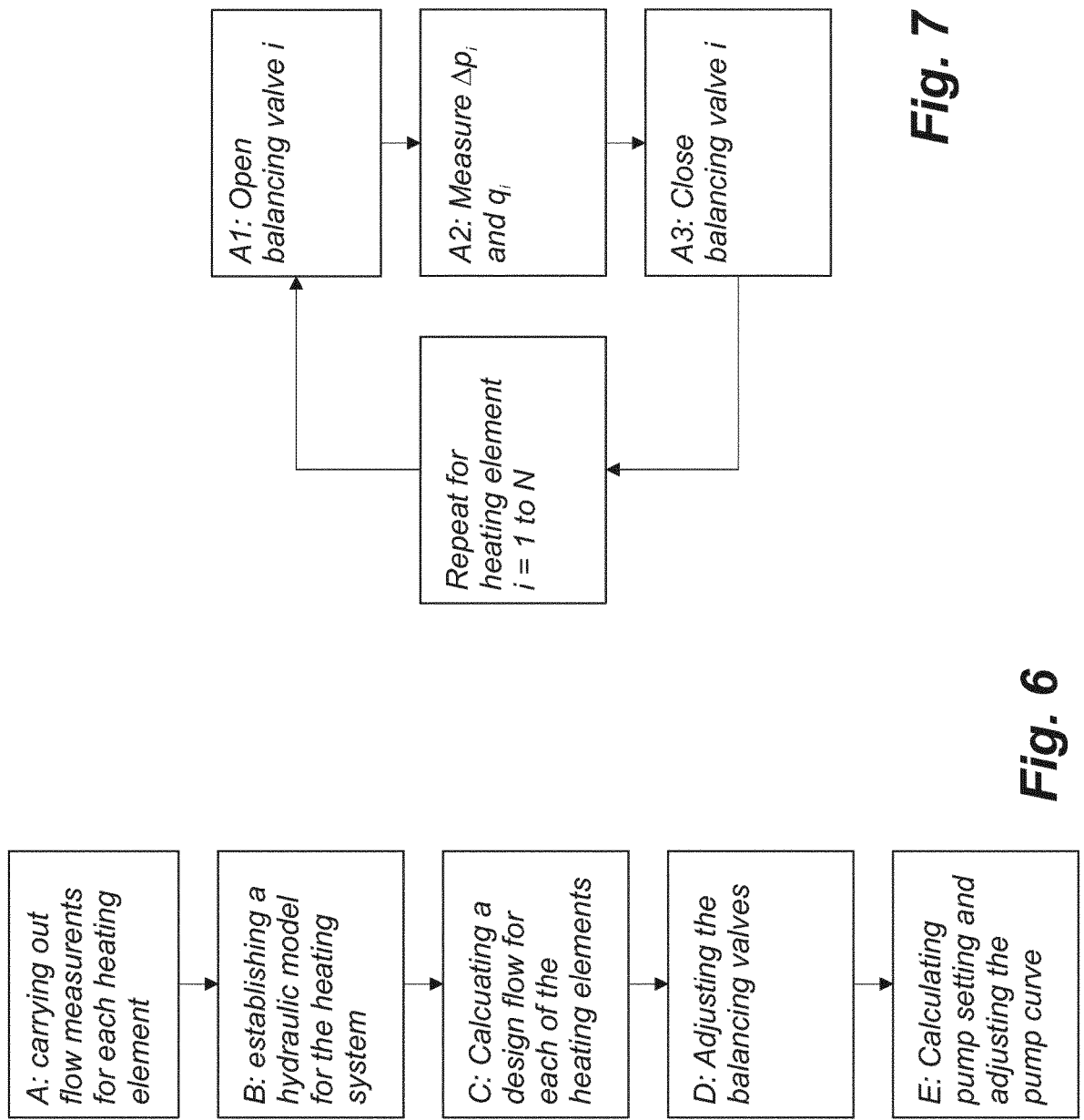

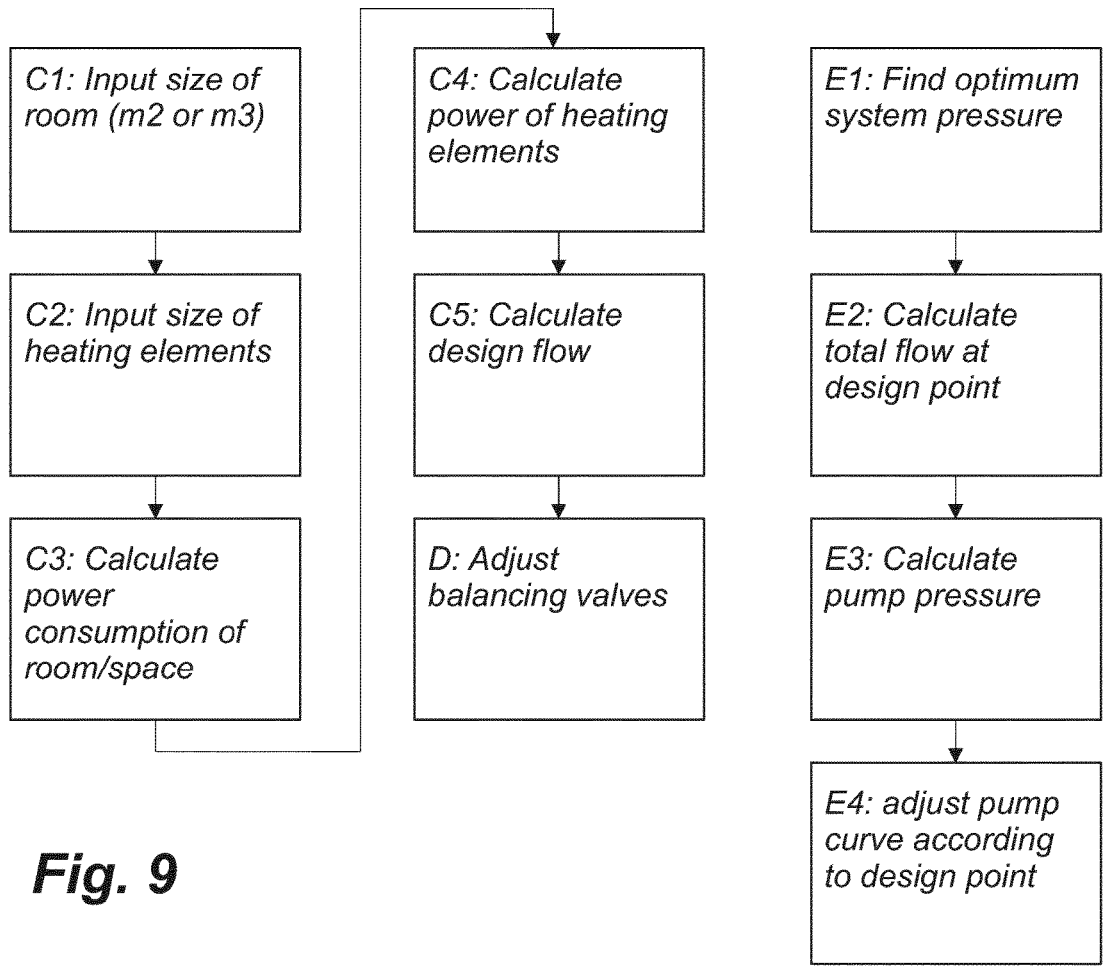
Fig. 9
Fig. 10
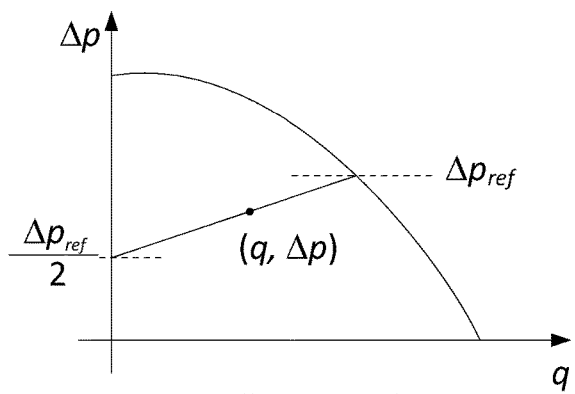
Fig. 11a
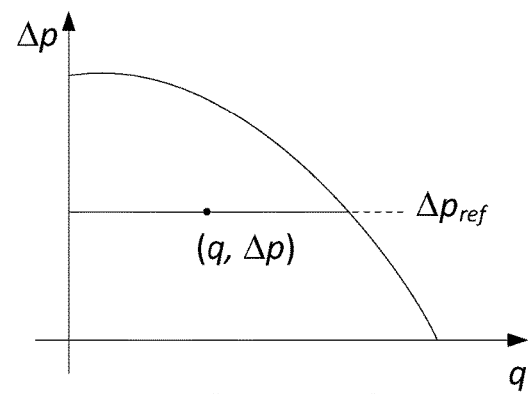
Fig. 11b

METHOD AND SYSTEM FOR BALANCING A HEATING SYSTEM

FIELD OF THE INVENTION

The present invention relates to a method of balancing a heating system. The invention further relates to a handheld communication device for balancing a heating system. The invention additionally relates to a balancing system for balancing a heating system.

BACKGROUND OF THE INVENTION

Low return temperatures are important in heating systems as the efficiency of for example condensing boilers of such heating systems depends heavily on this temperature. In addition, district-heating systems typically puts requirements on the return temperature. To ensure a sufficiently low return temperature, the flows through heating elements of the system, e.g. radiators or floor heating pipes, must be limited during especially transient phases, e.g. if the heating system has been powered down during night. This may be done by adjusting the pump pressure and/or balancing the valves of the system.

The pressure across a balancing valve in the heating system needs to be set correctly in order to be able to provide the necessary regulation of the heating system. If one balancing valve is set such that the corresponding loop or hydraulic line has a wrong hydraulic resistance, the corresponding heat element may take up the majority of the flow, especially at the transient phase.

EP2085707 discloses a heating system for heating a fluid of a flow system, wherein the system comprises a heater, a supply flow and a return flow. The system comprises means for detecting a volume flow and means for detecting a pressure difference between the supply flow and the return flow, such that the system may be hydraulically balanced.

EP2728269 discloses a method for hydraulic balancing of a heating system. The method involves the step of opening valves in a defined manner and computing or measuring a flow rate and a pressure difference in the system, whereby a hydraulic resistance of radiators in the system may be computed.

However, prior art systems for balancing heating systems are not very accurate and are based on an assumption of static conditions for the system. Accordingly, they do not accommodate for the fact that the hydraulic resistance of the heating elements and the heat source, and even the characteristics of a pump of the heating system, may vary over time due to wear, modifications to the systems, or the like.

Consequently, there is a need for improved methods and systems for balancing heating systems.

SUMMARY OF THE INVENTION

It is an object of the invention to obtain a new method as well as an app for implementing on a handheld communication device, which overcome or ameliorates at least one of the disadvantages of the prior art or which provide a useful alternative.

According to a first aspect of the invention, this is obtained by a method of balancing a heating system, wherein the heating system comprises:
a flow system comprising a supply flow line and a return flow line,
a heat source and at least a first pump coupled to the flow system and pumping fluid through the heat source to the flow system, and
a plurality of hydraulic lines between the supply flow line and the return flow line, at least a number of which have a heating element with a dedicated balancing valve and optionally a regulation valve, wherein the method comprises the steps of:

A) carrying out one or more measurements for each of the hydraulic lines by opening one hydraulic line only and determining a flow rate through the pump and a pressure difference across the pump, B) establishing a hydraulic model for at least a part of the heating system based on the determined flow rate and pressure difference from at least two measurements from step A), and at least one additional measurement for at least two hydraulic lines from step A), C) specifying a desired flow rate for each of the hydraulic lines, and D) adjusting one or more of the dedicated balancing valves in order to meet the desired flow rate for each of the hydraulic lines by using the hydraulic model.

This provides a method that more accurately can adjust the optimum desired flow (design flow) setting for each of the heating elements of the system, whereby a more precise balancing of the heating system may be achieved. Further, the method may also be used for accurately balancing the heating system over time, even though the hydraulic resistances of the heat source and heating elements as well as the pump characteristics may change due to wear, modifications to the systems, or the like. Thus, the inventive method enables an adaptation of the settings of the balancing valves to changed system parameters by making first a system or parameter value identification, then establishing a hydraulic model, and then balancing the valve settings, i.e. their opening degrees, according to the new model.

It should be mentioned that the desired flows (or design flows) through the various hydraulic lines or heating elements may be predetermined or pre-appointed values. However, according to the invention, the values may also be calculated by use of special balancing and mapping models, which will be described later.

The method may at least partly be implemented on an app installed on a handheld communication device, such as a smart phone or a tablet. An operator or service technician that has to balance the heating system may walk around along the system and in turn open the dedicated balancing valves and carry out the associated measurements, after which the measurement determined flow rate and pressure may be input into the app. Once the sequence of measurements has been finished, the app may calculate the hydraulic model as well as the desired flow for each of the heating elements. The user may then, based on the feedback from the app, adjust the plurality of balancing valves in order to obtain an optimum and balanced flow setting for the entire heating system.

The at least one additional measurement carried out in step B) is utilised in order to obtain three equations, whereby three variables of the system can be determined, viz. the hydraulic resistances of the heat source, the first hydraulic line, and the second hydraulic line. It is clear that the additional measurement is preferably also utilised to determine a pressure difference across the pump and a flow rate through the pump.

In an advantageous embodiment, the hydraulic model is utilised to calculate a flow rate through the heating system, and said flow rate through the heating system is compared to the desired flow rate for each of the hydraulic lines in order to adjust the one or more of the dedicated balancing valves in step D).

The pump may be connected either to the supply flow line or the return flow line. The pump and the heat source are preferably coupled in series to the flow system.

Definitions

The heating system may be a domestic heating system, a district heating system or a central heating system.

The heating elements may for instance be radiators or floor heating pipes.

The dedicated balancing valve is used for limiting the flow through a particular heating element. This valve can be placed before the heating element or after the heating element.

The regulation valve is typically used for controlling the flow rate through the heating element as a function of the temperature in the room to be heated. It can be placed before the heating element or after, and is in some situations built together with the balancing valve, i.e. the balancing valve and the regulation valve being formed as an integrated unit. The regulation valve can be a thermostatically regulated valve, a manually operated valve, a wax valve actuator as is often used in floor heating or a magnet valve.

In the following, the desired flow is also referred to as the design flow. The "design flow" is the flow rate that is necessary in order for the heating element to emit the desired or optimum amount of heat (or equivalently for the fluid to obtain the desired or optimum loss of temperature) as the heated liquid passes the heating element. The design flow is calculated for a design point of the heating system, which represents standard conditions for the systems with set design loads and design temperatures, e.g. a room temperature of 22 degrees Celsius and outdoor temperatures of −12 degrees Celsius. However, as previously mentioned, the design flow may also have been pre-determined or set beforehand, optionally in accordance with other considerations The heat source may in general be any type of heater, which is used for providing heated liquid to the flow system, such as a heater, a boiler or a heat pump.

The flow rate through the pump and the pressure across the pump are preferably determined by the pump itself. The parameters may be measured directly, or alternatively indirectly by use of other flow dependent variables, such as the electrical power of the pump, the rotational speed of the shaft, as well as internal currents such as the electrical currents in the windings of a stator. The values may for instance be determined by use of the system and method described in patent application EP 2696175 A1, which is incorporated herein by reference.

According to a preferred embodiment, the step for establishing a hydraulic model of the heating system is carried out via the following steps:

B1) opening a first balancing dedicated valve and closing the remainder of the plurality of balancing valves in order to set a first flow setting for the flow system,
B2) measuring a pressure difference and a flow rate for the first flow setting,
B3) opening a second dedicated balancing valve and closing the remainder of the plurality of balancing valves in order to set a second flow setting for the flow system,
B4) measuring a pressure difference and a flow rate for the second flow setting,
B5) opening the first balancing valve and the second balancing valve in order to set a third flow setting for the flow system,
B6) determining a pressure difference and a flow rate for the third flow setting, and
B7) calculating a hydraulic model for heating system based on measurements from steps B2), B4), and B6).

Thereby, it is possible to calculate the hydraulic resistance or flow resistance ($R_0$) of the heat source, which is one of three unknown variables of the heating system, the two remaining being a hydraulic resistance or flow resistance ($R_1$) of the hydraulic lines comprising the first heating element and a hydraulic resistance or flow resistance ($R_2$) of the hydraulic line comprising the second heating element. It should be noted the hydraulic resistance for a given loop is the resulting or total flow resistance of the heating element, the pipes, the dedicated balancing valve, and an optional regulation valve. Thereby, it is possible to empirically determine the flow resistance of the heat source, whereby it is possible to more accurately determine an optimum flow for the individual heating elements of the heating system and more accurately balancing the system. Further, it is also easier to rebalance the system in order to accommodate for wear or other changes over time.

Accordingly, the hydraulic model may at least comprise a calculation of the hydraulic resistance $R_0$ in the heat source.

According to a particular advantageous embodiment, step B) further involves the additional step of closing all the balancing valves in order to set a bypass flow setting and measuring a pressure difference and a flow rate for the bypass flow setting, and wherein step B7) is calculated also on basis of the measurement from said additional step. This is particular relevant for a heating system having a bypass line. By carrying out this additional step, it is possible to also measure the hydraulic resistance or flow resistance ($R_b$) through the bypass line. Accordingly, it is now possible to determine a hydraulic model of a heating system with a bypass line and including both the flow resistance ($R_0$) of the heat source and the flow resistance ($R_b$) of the bypass line via four measurements to calculate four unknown variables of the system.

Accordingly, the hydraulic model may at least comprise a calculation of the hydraulic resistance $R_b$ of a bypass line of the heating system.

In an advantageous embodiment, measurement steps B1-B4 are carried out during step A). Accordingly, it is seen that the measurements that in general are used for establishing a design flow for each of the heating elements and balancing may also be used for establishing the hydraulic model. However, a subsequent measurement has to be carried out, where dedicated balancing valves are opened for two of the heating elements in order to carry out measurement step B5). However, the measurements of individual balancing valves and heating elements need not be repeated for the step for establishing the hydraulic model of the system.

In another advantageous embodiment, the step for establishing a hydraulic model of the heating system is carried out for different sets of two heating elements and dedicated balancing valves. Thereby, it is possible to carry out additional measurements to verify or over-determine the hydraulic model and accordingly calculate the values of the model with a higher level of significance. The overdetermined hydraulic model may for instance be established based on a measurement with a first and a second balancing valve open, as well as a measurement based on a measurement with a third and fourth balancing valve open. However, it may also be carried out via a first measurement with the first and the second balancing valve open, and a second measurement with the second and third balancing valve open. Of course, it is also possible to establish the model via three, four, five or even more measurements with different sets of balancing valves open.

In one embodiment, the step for calculating the desired flow for the individual heating elements is based on a size of a space of which the individual heating element is to heat, e.g. the floor area or the volume of the area. The design flow may more accurately be calculated, if the area or volume of the space, e.g. a room, is known, since the required power may be calculated in order to maintain temperature equilibrium in the room.

In another embodiment, the step for calculating the desired flow for the individual heating elements is based on a size of said heating element. Preferably, the calculating step is based on both an input on the size (e.g. area or volume) of the space as well as the size of the heating element. Thereby, it is possible to more accurately estimate the required flow rate setting in order to obtain the required temperature drop of the fluid as it passes the heating element, e.g. based on the required emitted power to maintain temperature equilibrium.

It is recognised that two parallel loops and thereby two different heat elements may be used in order to heat a given space. In such a case, the distributed loads or the desired flows may be calculated based on a weighting function, where the relative sizes and positions of the heating elements are accounted for.

The method or an app running the method may advantageously generate a warning, if the desired flowrate of one of the individual heating elements is higher than the maximum flow rate of the system. This indicates that the pump is running on the maximum curve during the balancing and that it is not possible to obtain the design flow with the given pump.

The warning may be given as a sound or a text message from an app installed on a handheld communication device.

A warning may also be generated, if a difference between a supply temperature and return temperature of an individual heating element is lower than a predefined threshold, alternatively that the return temperature is higher than a predefined threshold. This indicates that the size of the heating element is too small to emit the required heat or power to the given space. This may be accommodated by increasing the supply temperature or changing the heating element, e.g. to a larger radiator.

Further, a warning may be generated, if a calculated return temperature is lower than a predefined threshold. This does typically not provide any problems for the heating system. However, it could indicate that some of the values used for the calculations are not correct, e.g. a room area or volume, power per square meter, or the radiator size. It could also be an indicator that some of the determined flow rates and/or pressures have been erroneous or erroneously being input into the app running on the handheld communication device.

According to an advantageous embodiment, the method further comprises the step of determining which dedicated balancing valve that requires the highest pressure, and wherein a required system pressure provided by the pump is subsequently calculated based on said dedicated balancing valve. The valve that has the highest pressure requirement corresponds to the dedicated balancing valve, where the difference between the desired flow (or design flow) and the measured flow rate is smallest. Accordingly, the required system pressure may also be calculated on basis on the minimum value of the difference between the design flow and the measured flow for the plurality of dedicated balancing valves.

In another advantageous embodiment, the method further comprises the additional step of calculating required pump settings and adjusting the pump speed to meet the required pump settings plus a given robustness factor. Thereby, the pump speed can be set to a pump curve on or just above the required settings, whereby the power requirements for the pump may be set to a minimum, thus minimising the power consumption of the system and in particular of the pump. This may provide a huge environmental advantage in terms of lowering the carbon footprint of the heating system as well as an economic advantage in lowering the overall power consumption. The robustness factor may in principle be set to zero, in which case the system is set to the optimum conditions. However, the robustness factor may be set to a value to accommodate for possible uncertainties in the calculations. Further, the hydraulic resistance of the heat source, and the heating element as well as the characteristics of the pump may change over time, and with a very low robustness factor, the system has to be serviced more regularly in order to ensure that the system runs at the optimum balancing conditions.

In yet another advantageous embodiment, the method of calculating the required pump settings comprises the step of calculating a required pump flow at a design point of the system. The required pump flow may for instance be calculated as a sum of the desired flows of the individual hydraulic lines, optionally plus a flow rate for a bypass line of the heating system.

In one embodiment, a required pump pressure of the pump is calculated as a sum of the required system pressure, a calculated pressure loss of the heat source, and the robustness factor, wherein said calculated pressure loss being calculated on basis of the hydraulic model. A pump curve of the pump may subsequently be set based on the calculated required pump pressure of the pump.

The pressure difference and the flow rating are preferably determined from measurements by one or more sensors. The one or more sensors may be implemented in the pump. The measurements may also be carried out by use of a sensor in the pump and one external sensor. The pressure measurement may for instance be carried out by use of the pump, whereas the flow rate may be measured via a separate sensor or estimator in the flow system.

In a highly advantageous embodiment, various steps, such as input of values and calculation steps, are carried out by use of a handheld communication device running an app, or via an app implemented in the pump, or via an app implemented in an electronic converter unit, which may be detachably coupled to a housing of the pump. Some of the calculations may also be carried out by use of an external server, e.g. wherein the handheld communication device communicates with said external server.

Accordingly, the invention also provides a pump provided with means for communicating with a handheld communication device, where the pump is further adapted to calculate a hydraulic model for use in balancing heating elements of a heating system. An app or a software program that is installed in the pump may carry out the calculations. In such an embodiment, the user or service technician does not necessarily need a handheld communication unit in order to carry out the invention.

The communication between the handheld communication device and the pump unit may be carried out directly between the units, i.e. without the use of an electronic converter unit. In a bidirectional communication mode, the pump unit may incorporate means for communicating wirelessly with the external communication device, either via optical communication or, by way of example, via radio frequency communication, Bluetooth®, GSM, CDMA, 3G or 4G. The pump unit may incorporate in its internal software programme storage the instructions for balancing a heating system according to the invention, and the programme for calculating the design flows and hydraulic resistances of the heating system. The app has so to speak been moved from the external communication device into the pump unit.

According to another aspect, the invention provides a handheld communication device running an app for balancing a heating system, wherein the heating system comprises:
 a flow system comprising a supply flow line and a return flow line,
 a heat source and at least a first pump coupled to the flow system and pumping fluid through the heat source to the flow system, and
 a plurality of hydraulic lines between the supply flow line and the return flow line, at least a number of which have a heating element with a dedicated balancing valve and optionally a regulation valve, wherein
 the app is adapted to receive input about pressure differences and flow rates measured at different settings of the dedicated balancing valves, and wherein
 the app is adapted to calculate a hydraulic model for the heating system based on the input, and
 the app is adapted to calculate and display in the handheld communication device a desired flow for each of the balancing based on the input as well as the calculated hydraulic model.

The handheld communication device may for instance be a smart phone, a tablet, or a PDA, but it may also be a wearable device, such as a smart watch.

The handheld communication device is preferably adapted to carry out at least parts of the aforementioned method embodiments, e.g. any of the aforementioned calculation steps and/or providing warnings to a user or operator of the system.

In one advantageous embodiment, the app is further adapted to receive additional input about the number of heating elements and information about spaces, such as areas or volumes, to be heated by the heating system, and where the app is adapted to calculate the design flows based on said additional input, e.g. based on weighting functions.

It is recognised that this method of mapping the rooms and heating elements in order to calculate the design flow is generic and independent of the hydraulic model.

Accordingly, the invention also provides a method of balancing a heating system, wherein the heating system comprises:
 a flow system comprising a supply flow line and a return flow line,
 a heat source and at least a first pump coupled to the flow system and pumping fluid through the heat source to the flow system, and
 a plurality of hydraulic lines between the supply flow line and the return flow line, at least a number of which have a heating element with a dedicated balancing valve and optionally a regulation valve, wherein the method comprises the steps of:
 A) mapping rooms and heating elements of the heating system for heating said rooms, and
 B) calculating a design flow for each of the hydraulic lines based on the mapping of step A).

It is recognised that the design flow may be calculated on basis of a design point of the system, e.g. based on a desired room temperature and a given outside temperature. Preferably, the method further comprises the step of adjusting one or more of the dedicated balancing valves in order to meet the design flow.

In another advantageous embodiment, the app further provides a guide to a user or service technician, instructing the user on a sequence for opening and closing balancing valves of the heating system and carrying out measurements. Thus, the app provides a checklist for the user or service technician on a sequence for balancing the heating system. The guide or check list may for instance provide the order of opening and closing the valve and carrying out the measurements as well as prompt the user to input e.g. the size of the space to be heated and/or the size of the heating element. The app may further prompt the user to input the determined pressure difference and flow rate for the given flow setting of the system. The result is faster balancing of a heating system than known in prior art, reduced risk of errors by the operator and precise calculation results.

According to a third aspect, the invention provides a balancing system comprising a heating system and a handheld communication device according to any of the aforementioned embodiments, wherein the heating system comprises: a flow system comprising a supply flow line and a return flow line, a heat source and at least a first pump coupled to the flow system and pumping fluid through the heat source, and a plurality of hydraulic lines, at least a number of which comprises a heating element and a dedicated balancing valve, arranged between the supply flow line and the return flow line.

In one advantageous embodiment, the handheld communication device and pump of the heating system are adapted to wirelessly communicate with each other. The handheld communication device may for instance be able to read out settings or measurements from the pump. Further, the handheld communication device may possibly be able to set operating parameters of the pump.

In another embodiment, the handheld communication device and pump of the heating system are adapted to wirelessly communicate with each other via an electronic converter unit, which is adapted to read an output from the pump, and which electronic converter unit further is provided with a transmitter for transmitting electrical signals indicative of the output from the pump to the handheld communication device. The operator, which is to balance the heating system, may use such a device to get access to readouts from a given pump for pumping the heating fluid through the flow system of the given heating system. The operator may then walk around to the different balancing valves of the heating system and set the necessary flow settings and carry out the associated measurements needed for balancing the heating system.

In one embodiment, the pump includes a housing, which comprises a signal source for emitting a signal, and wherein the electronic converter unit comprises:
 a signal detector for measuring the signal emitted from the signal source of the pump, and wherein the electronic converter unit is adapted to be detachably connected to the pump unit and in that the electronic converter unit further comprises:
 a converter unit for converting said signal to electrical signals, and
 transmitting means for transmitting the electrical signals to the handheld communication device.

In an advantageous embodiment, the signal source is a light source, and wherein the signal detector is a photo detector for measuring the light emitted from the light source of the pump, and wherein the converter unit is adapted to converting optical signals to electrical signals. However, according to another embodiment, the signal source may also be a sound generator, e.g. a loudspeaker, and the signal detector being a microphone. Further, it is possible to use electrical communication, such as RFID or NFC between the pump and the electronic converter unit.

The external communication unit is preferably a handheld communication device, such as a smart phone.

The invention allows a user or service worker having a handheld communication device, such as a smart phone, to read out information about the operating status from the pump unit. By allowing a converter device and a handheld communication device to access to the pump unit, the necessity of having an expensive user interface provided on the pump unit is further eliminated. Thereby, the production price for the manufacturer and the purchase price for the end consumer may be lowered. In this case the electronic converter unit communicates unidirectionally with the pump unit, and unidirectionally or bidirectionally with the handheld device.

Additionally, if the converter device also acts to provide access to control of the pump unit, the invention provides a secure access to the pump unit, since the user both have to have an electronic converter unit and a handheld communication device with the correct app installed on the handheld communication device. Further, by removing the option to program the pump unit via a control panel, the security of the system is improved and ensures that the pump unit cannot be tampered with or reprogrammed without proper permission. In this case the electronic converter unit communicates bidirectionally with the pump unit, and unidirectionally or bidirectionally with the handheld device.

It is noted that the electronic converter unit is retrofitted to the pump unit and accordingly is a separate device. Accordingly, the electronic converter unit may preferably be detachably coupled to the housing of the pump unit.

The status or operational parameters that can be read out from the pump unit into the electronic converter unit are parameters, such as flow (m3/hour), pressure (metres or bar), electrical current (ampere) used by the motor of the pump or the rotational speed of the rotor and impeller (RPM).

The pump unit preferably comprises a pump and an electrical motor. Further, the pump unit may comprise a control box. The pump and electrical motor may be integrated in a common housing, or be separated into a pump housing and a motor housing. The control box (also called terminal box or frontend) may be integrated into one of the housings or it may be a separate unit. The control box may thus be an external unit having a separate housing, and it is recognised that the electronic converter unit may be retrofitted to the housing of the control box. The control box may be arranged at any position of the pump, e.g. in the front or at the side of the pump unit. The control box may include electronics for controlling the pump unit.

The electronic converter unit is adapted to be detachably coupled to the housing of the pump unit. Accordingly, the electronic converter unit may be easily be attached and detached from the housing of the pump unit and be used for reading out the operating status from a plurality of pump units.

The converter device is advantageously adapted to transmit the electrical signals as an infrared signal or as a radio signal, such as GSM, CDMA, 3G, 4G, and Bluetooth®.

In one advantageous embodiment, the electronic converter unit is provided with a housing having an aperture, and wherein the photo detector is arranged within the housing behind the aperture. Accordingly, the photo detector of the electronic converter unit may be arranged so that a minimum of surrounding light enters the housing an affects the detection of light emitted from the pump unit.

The electronic converter unit is advantageously provided with attachment means for attaching the electronic converter unit to the housing of the pump unit. The attachment means may for instance be chosen from the group of: mechanical fasteners, magnetic fasteners, and adhesive fasteners. The adhesive fastener may for instance be a double-adhesive tape, such as a double-adhesive tape having a layer of foam cells, e.g. acrylic based foam cells. The adhesive is preferably releasable, such that the electronic converter unit may easily be removed from the housing of the pump unit.

In an advantageous embodiment, the fastening means are adapted to align the aperture of the electronic converter unit with the light source of the pump unit. Accordingly, the fastening means may provide an easy relative alignment between the electronic converter unit and the pump unit in order to ensure an efficient readout of light emitted from the pump unit.

In another advantageous embodiment, the electronic converter unit comprises an electronic signal amplification circuit, and optionally further comprises means for shutting off the unit or lowering its energy consumption, if a communication idle-time-limit has been reached.

The invention also provides a pump unit, which includes a housing provided with a signal source for emitting a signal, advantageously indicative of an operating status of the pump, wherein the pump via said signal source is adapted to communicate with an electronic converter unit, which may be detachably coupled to the pump. The signal source may be specially designed for communicating with the electronic converter unit, e.g. having no other purpose.

In an advantageous embodiment, the pump is adapted to communicate with the electronic converter unit via said signal source in near field communication only. Accordingly, the pump may be adapted to communicate with the electronic converter unit only when it is attached to the housing of the pump, or at least arranged in near vicinity of the pump.

The invention also provides a system for checking the operating status of a pump unit, wherein the system comprises a pump unit, an external communication unit, and an electronic converter unit, wherein the pump unit comprises a housing and a signal source, advantageously a light source, for emitting a signal, advantageously light, and further advantageously to display an operating status of the pump unit, and wherein the electronic converter unit is adapted to be retrofitted to an external part of the housing of the pump unit and adapted to convert signals from the pump unit to electrical signals and to transmit the electrical signals to the external communication unit, and wherein the external communication unit is adapted to receive and process electrical signals sent from the electronic converter unit so as to display the operating status of the pump unit on a display of the external communication device.

The invention advantageously provides a system for checking the operating status of a pump unit, wherein the system comprises a pump unit, an external communication unit, and an electronic converter unit according to any of the aforementioned embodiments, wherein the pump unit comprises a housing and a light source for emitting light to display an operating status of the pump unit, and wherein the electronic converter unit is adapted to be retrofitted to an external part of the housing of the pump unit, and wherein the external communication unit is adapted to receive and process electrical signals sent from the electronic converter unit so as to display the operating status of the pump unit on a display of the external communication device.

In other words, the external communication device may be provided with a receiver for receiving electrical signals sent from the electronic converter unit, and a processing unit for processing the electrical signals received.

In a preferred embodiment, the handheld communication device has an app installed and running on the handheld communication device for processing the electrical signal received from the electronic converter unit.

In one advantageous embodiment, the external communication device is further adapted to control the pump unit via the electronic converter unit. Accordingly, the electronic converter unit may provide a two-way communication between an external communication device and a pump unit.

As previously mentioned, the invention may also more broadly refer to a general signal source and a corresponding detector, e.g. a sound generator and microphone or an RFID or NFC signal source and an RFID or NFC receiver.

The invention provides an electronic converter unit for a pump unit, wherein the pump unit includes a housing and comprises a communication system for transmitting an operating status of the pump unit, wherein the communication system comprises an RFID or near-field communication (NFC) unit, and wherein the electronic converter unit is adapted to be retrofitted to an external part of the housing of the pump unit and in that the electronic converter unit comprises:
 a RFID or near-field communication receiver,
 a converter unit for converting RFID or NFC signals to electrical signals, and
 transmitting means for transmitting the electrical signals to an external communication unit.

The invention further provides a system for checking the operating status of a pump unit, wherein the system comprises a pump unit, an external communication unit, and an electronic converter unit, wherein
 the pump unit comprises a housing and a communication system for transmitting an operating status of the pump unit, wherein the communication system comprises an RFID or near-field communication (NFC) unit, and wherein
 the electronic converter unit is adapted to be retrofitted to an external part of the housing of the pump unit and adapted to convert RFID or NFC signals from the pump unit to electrical signals and to transmit the electrical signals to the external communication unit, and wherein
 the external communication unit is adapted to receive and process electrical signals sent from the electronic converter unit so as to display the operating status of the pump unit on a display of the external communication device.

The communication between the pump unit and the electronic converter unit may for instance be based on induction coils or loop antennas.

The systems utilising optical readout and the RFID or NFC based communication are linked by a common inventive concept in that the display of the pump unit may be simplified and in that a retrofitted electronic converter unit is utilised to convert the output from the pump unit, which may also provide additional improved security aspects.

In broader terms, the invention provides an electronic converter unit for a pump unit, wherein the pump unit includes a housing and comprises a communication system for transmitting an operating status of the pump unit, and wherein the electronic converter unit is adapted to be retrofitted to an external part of the housing of the pump unit and in that the electronic converter unit and comprises:
 a proximity detector,
 a converter unit for converting transmitted signals from the pump unit to electrical signals, and
 transmitting means for transmitting the electrical signals to an external communication unit.

Accordingly, it is seen that the communication system of the pump unit may comprise a light source, a RFID transmitter, or and NFC transmitter. The proximity detector of the electronic converter unit may for instance be a photo detector, a RFID receiver or an NFC receiver.

In another embodiment, the settings of the pump may be set from the handheld communication device.

In yet another embodiment, at least a number of the plurality of balancing valves are electronic valves, which may be set via the app. Thus, the settings of the balancing valves may automatically be set after the necessary balancing steps and measurements have been carried out.

According to an advantageous embodiment, at least a number of the plurality of heating elements also have a regulation valve, which may be manually set by a user of the heating system. A user may for instance set the regulation valve, if the user desires the given space, e.g. a room to have a lower or higher temperature than the design temperature of the system. During the method, the regulation valves may advantageously be fully opened or removed.

In a fourth aspect, the invention provides method of calculating a hydraulic model suitable for the balancing and regulating of a heating system, wherein the heating system comprises:
 a flow system comprising a supply flow line and a return flow line,
 a heat source and at least a first pump coupled to the flow system and pumping fluid from the heat source to the flow system, and
 a plurality of hydraulic lines and comprising a first hydraulic line and a second hydraulic line between the supply flow line and the return flow line, at least a number of which have a heating element with a dedicated balancing valve and optionally a regulation valve, wherein the method comprises the steps of:
 a) opening the first hydraulic line and closing the remainder of the hydraulic lines in order to set a first flow setting,
 b) measuring a pressure difference and a flow rate for the first flow setting for the flow system,
 c) opening the second hydraulic line and closing the remainder of the hydraulic lines in order to set a second flow setting for the flow system,
 d) measuring a pressure difference and a flow rate for the second flow setting,
 e) opening the first hydraulic line and the second hydraulic line in order to set a third flow setting for the flow system,
 f) measuring a pressure difference and a flow rate for the third flow setting, and g) calculating a hydraulic model for the heating system based on measurements from steps b), d), and f).
model for the heating system based on measurements from steps b), d), and f).

It is recognised that the hydraulic model may also be used for other purposes than balancing of the heating system. In this method, the determined flow rate and pressure difference need not necessarily be at the pump, but may also be measured by one or more sensors at the supply flow line and return flow line.

In an advantageous embodiment, the method further involves the additional step of closing all the balancing valves in order to set a bypass flow setting and measuring a pressure difference and a flow rate for the bypass flow setting, and wherein step g) is calculated also on basis of the measurement from said additional step. This is particular relevant for a heating system having a bypass line. By carrying out this additional step, it is possible to also measure the hydraulic resistance or flow resistance ($R_b$) through the bypass line. Accordingly, it is now possible to determine a hydraulic model of a heating system with a bypass line and including both the flow resistance ($R_0$) of the heat source and the flow resistance ($R_b$) of the bypass line via four measurements to calculate four unknown variables of the system.

BRIEF DESCRIPTION OF THE FIGURES

The invention is explained in detail below with reference to embodiments shown in the drawings, in which FIGS. 1a and 1b show a schematic view of a heating system and an equivalent hydraulic resistance diagram for the heating system.

FIG. 6 shows a flow chart illustrating the overall steps of a method according to the invention, FIGS. 7-10 show flow charts of substeps of the steps of FIG. 6, FIGS. 11a and 11b show pump curves of the pump set in accordance with the optimum system pressure and flow rate.

DETAILED DESCRIPTION OF THE INVENTION

Figure 2:
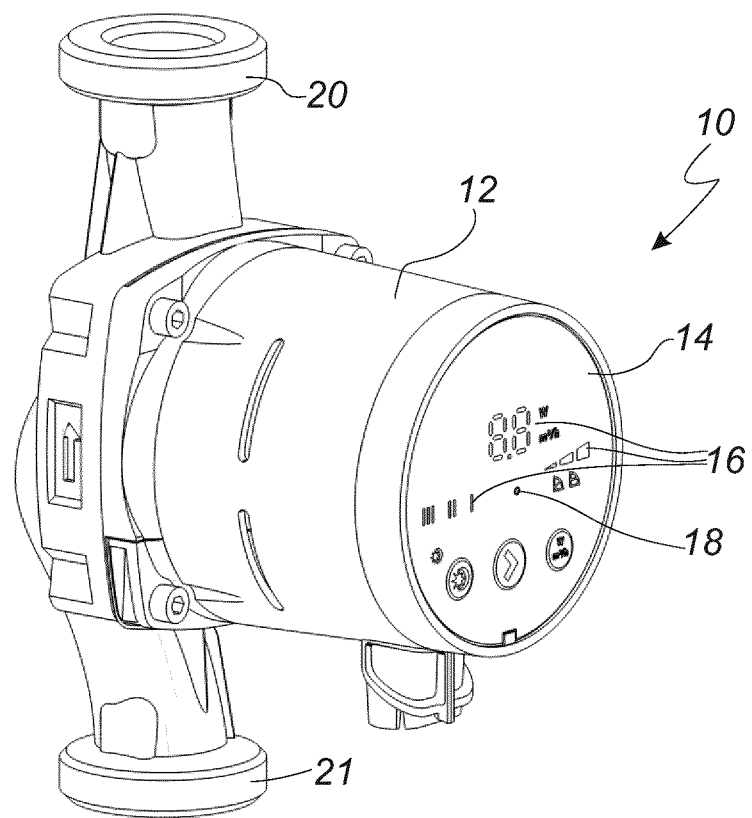
FIG. 2 shows a perspective view of a pump unit.

The present invention relates to a method and system for accurately balancing a heating system. An operator or service technician may preferably carry out the method by use of a handheld communication device, such as a smart phone, running an app, which is utilised to calculate the optimum balancing setting for the heating system.

FIG. 1 shows a schematic view of a heating system 150 that is to be balanced via the calculations provided by the app running on the handheld communication device.

The heating system 150 comprises a flow system comprising a supply flow line 60 and a return flow line 70. A heat source 55, e.g. in form of a boiler, and a pump 10 are coupled to the flow system. A plurality of heating elements $H_1$-$H_n$ are coupled in parallel between the supply flow line 60 and the return flow line 70 in separate hydraulic lines $L_1$-$L_n$. The heating elements may for instance be radiators or floor heating pipes and each comprise an inlet on the supply flow side and an outlet on the return flow side. Each of the hydraulic lines $L_1$-$L_n$ are provided with a dedicated balancing valve $V_1$-$V_n$. In the depicted figure, the balancing valves $V_1$-$V_n$ are provided on the outlet side of the heating elements $H_1$-$H_n$. However, they may also be provided on the inlet side of the heating elements $H_1$-$H_n$, and it is also possible that some of the balancing valves are arranged on the inlet side, whereas others are arranged on the outlet side.

The balancing valves $V_1$-$V_n$ are utilised to balance the overall flow of the heating system 150, e.g. in order to optimise the overall energy consumption of the heating system 150 and to provide an even heating of the total area that the heating system 150 heats. The balancing valves are balanced such that a design flow is achieved for each of the heating elements $H_1$-$H_n$. The design flow of a heating element corresponds to the optimum flow rate to achieve that the intended power or heat consumption of the room and the emitted power or heat from the heating element are identical. The design flow in other words corresponds to the optimum flow to achieve that the heating fluid experiences the optimum temperature loss from the supply line to the return line as it passes the heating element. The design flow is estimated on basis of a design point of the system, which is based e.g. on predetermined temperatures for the room temperature (e.g. 22 degrees Celsius) and the outside temperature (e.g. −12 degrees Celsius).

In general, each of the heating elements $H_1$-$H_n$ are arranged to emit heat to a given room or space. While each of the heating elements $H_1$-$H_n$ in FIG. 1 are depicted as a single heating element, it is recognised that each room or space may comprise two or more heating elements $H_1$-$H_n$, e.g. two radiators arranged in series.

Each of the hydraulic lines $L_1$-$L_n$ have an individual hydraulic resistance $R_1$-$R_n$ (also called a flow resistance) and the boiler 55 has an internal hydraulic resistance $R_0$. The heating system 150 may optionally comprise a bypass line 65, which may be provided with a separate bypass valve. The bypass line 65 has a hydraulic resistance $R_b$. In order to obtain an accurate balancing of the heating system 150, an accurate hydraulic model is needed, including an accurate estimate of the flow resistances $R_0$ of the boiler 55 and the flow resistances $R_b$ of the bypass line 65, respectively. While suppliers of heaters, such as boilers, may provide manuals stating the flow resistance of the heater, such numbers are seldom accurate, since even small variations in the bends of the pipe coils and so forth may influence the flow resistance severely. Further, the flow resistance may change over time due to wear or changes to the overall system. The present invention provides a method and a system for accurately calculating a hydraulic model of the heating system, whereby a more accurate balancing may be achieved.

The pump 10 provides a differential pressure op and a flow rate q to the system. However, the pressure and flow rate are not identical to the pressure differential $\Delta p_s$ of the flow system and the flow rate $q_s$ of the heating system 150.

Each of the heating elements $H_1$-$H_n$ may additionally comprise an additional adjustment valve $W_1$-$W_n$ in order for a user to be able to adjust the flow and the heating to a level below or above the design settings.

In order to calculate the hydraulic model of the heating system 150, the diagram of the heating system as shown may also be converted to an equivalent flow resistance diagram as shown in FIG. 1b. In such a diagram, each element or hydraulic line is represented by a flow resistance. The boiler 55 is represented by an internal flow resistance $R_0$, and the bypass line including the possible bypass valve is represented by a flow resistance $R_b$. Each of the flow loops containing a heating element and a dedicated balancing valve as well as the optional regulation valve are represented by a flow resistance $R_x$. It is seen that the resulting flow resistance for one loop is the total flow resistance of the heating element and the valve(s).

The method according to the invention as will be explained later involves the steps of setting the balancing valves in predetermined settings and measuring the corresponding flow rate q through the pump 10 and the pressure difference op across the pump 10. From the sequence and measurements, the hydraulic model as well as the design flow for each of the balancing valves may be calculated. The measurements may be carried out by sensors implemented in the pump 10 or by separate sensors. The pressure difference op and the flow rate q may also be determined indirectly from other flow dependent parameters, such as the electrical power and/or an electrical current of pump. The handheld communication device may communicate wirelessly with the pump 10 or sensors in order to obtain an automatic readout of the flow rate and pressure difference. This may be carried out by a direct wireless communication between the pump or sensor and the handheld communication device. However, it is also possible, as explained with reference to FIGS. 2-5, to use an electronic converter unit for a pump unit, which may read out an operating status of the pump unit and relay and optionally amplify the readout to the handheld communication device.

FIG. 2 shows a perspective view of a pump unit 10 or pump assembly. The pump unit 10 comprises a housing 12 or terminal box, which has a front end 14 or display, which may be provided with a number of display units 16, which may provide a simple indication of an operating status of the pump unit. However, an electronic converter unit may make it possible to simplify the front end 14 even further, as the necessity of having a display is alleviated, whereby the production cost and thereby the price for the end-consumer may be lowered considerably. Accordingly, the front end 14 may be provided without the display units 16. The front end 14 is further provided with a light source 18, e.g. in form of a single photo diode or a plurality of photo diodes. The pump unit 10 is under operation installed in a pipe system via the pipe flanges 20, 21.

The housing 12 or terminal box of the pump unit 10 houses an electrical motor and a drive shaft as well as control circuitry of the pump unit 10. In the depicted embodiment, the electric motor and pump parts are integrated into a common housing. However, in an alternative embodiment, the electrical motor and the pump may be arranged in separate housings. The control circuitry may control the light source 18 to emit light to display an operating status of the pump unit 10, whereby more detailed information about the operating status may be read out from the pump unit 10, e.g. as binary optical signals.

The front end 14 of the pump unit 10 may further be provided with one or more buttons, which may be pressed in order to initialise a sequence, where the light source 18 is brought to emit light in order to display the operating status of the pump unit 10.

Figure 3:
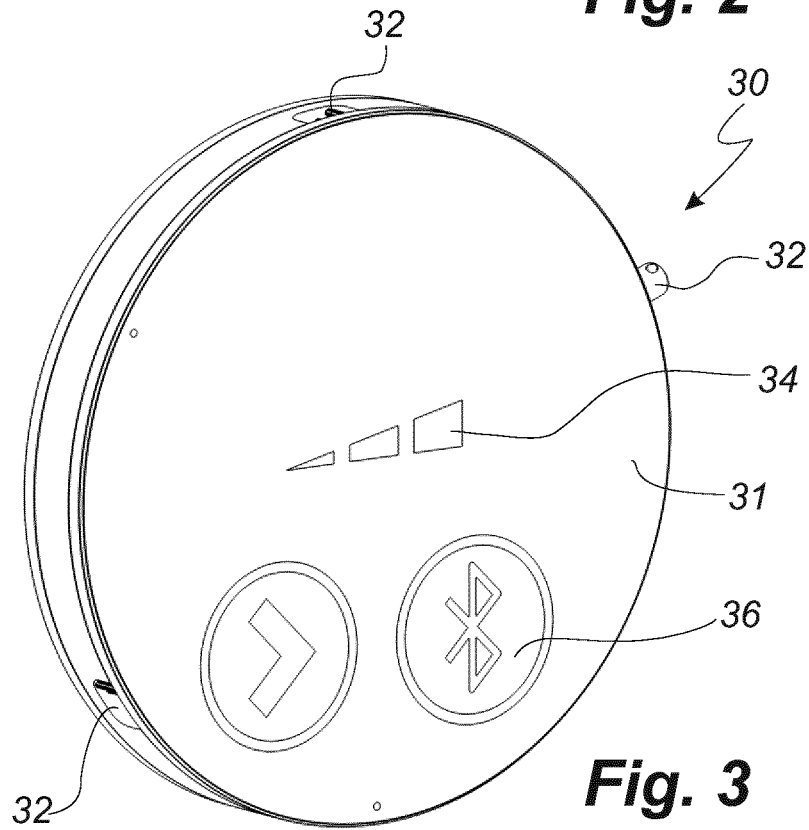
FIG. 3 shows a perspective view of a first embodiment of an electronic converter unit.

FIG. 3 shows a perspective view of an electronic converter unit 30 for use in the invention. The electronic converter unit 30 comprises a housing 31, which houses the electronic circuitry of the electronic converter unit 30. The electronic converter unit 30 is adapted to be attached or retrofitted to an external part of the housing 12 of the pump unit 10, preferably adapted to being detachably coupled to the housing 12 of the pump unit 10. The electronic converter unit 30 is shown as a circular shaped device, but can also have the shape of a rectangular box. For reasons of handiness, the outer contour of the unit 30 is in this embodiment smaller than the contour of the front end 14.

The electronic converter unit 30 comprises a photo detector (not shown in FIG. 3) for detecting light emitted from the light source 18 of the pump unit 10, and which is arranged on or near a side of the electronic converter unit 30, which when attached to the housing 12 of the pump unit 10 faces towards the housing 12 of the pump unit 10.

The electronic converter unit 30 may further comprise a number of attachment parts 32, e.g. in form of retractable mechanical fasteners (not shown in FIG. 3). A front end of the electronic converter unit 30 may further be provided with an indicator or display 34, e.g. for giving an indication of a signal strength of the measured optical signal emitted from the light source 18 of the pump unit 10. The display 34 may thus provide a visual feedback to a user providing information about the alignment of the photo detector relative to the light source 18 of the pump unit 10.

The light source 18 may for instance communicate with the electronic converter unit at a communication rate of e.g. 9600 Baud. The diode 18 can be a dedicated communication diode built into the front end 14 with the sole purpose of providing an optical communication with another electronic device. Alternatively, it can have two functions, namely acting as a visual status indicator to humans in the normal situation, and acting as communication diode in case the electronic converter unit is placed on the front end 14. Instead of the diode 18 other display units 16, i.e. segmented light emitting diodes, can act as the signal source. The segments can be turned on or off in a predetermined pattern that can be read and interpreted by the electronic converter unit 30. Advantageously these diodes are already present in the pump, i.e. no design changes have had to be made to the electronics or the front end of the pump; the diodes already at hand are simply getting a further task, namely the task of performing optical communication with the electronic converter unit 30.

In one embodiment, the communication between the electronic converter unit 30 and the pump unit 10 is not made with light signals. In general any signal source can be used for the communication, e.g. sound signals generated by the pump and received by the electronic converter unit. It may also be possible to utilise electrical signals sent over a wired connection, between the pump unit and the electronic converter unit. Such connection can be established with a plug connector in the electronic converter unit and a mating socket connection in the housing of the pump unit, e.g. in the front end 10.

The electronic converter unit 30 is further provided with a communication unit for converting the detected signal, such as the optical signal, to an electrical signal, such as infrared or a radio signal, e.g. based on GSM, CDMA, 3G, 4G, and Bluetooth® 36. The front end of the electronic converter unit 30 may be provided with one or more buttons to initialise a sequence, where the electronic converter unit 30 detects optical signals emitted from the light source 18 of the pump unit 10 and converts the optical signals to electrical signals and transmits the electrical signals to an external communication unit, such as a smart phone.

Figure 4:
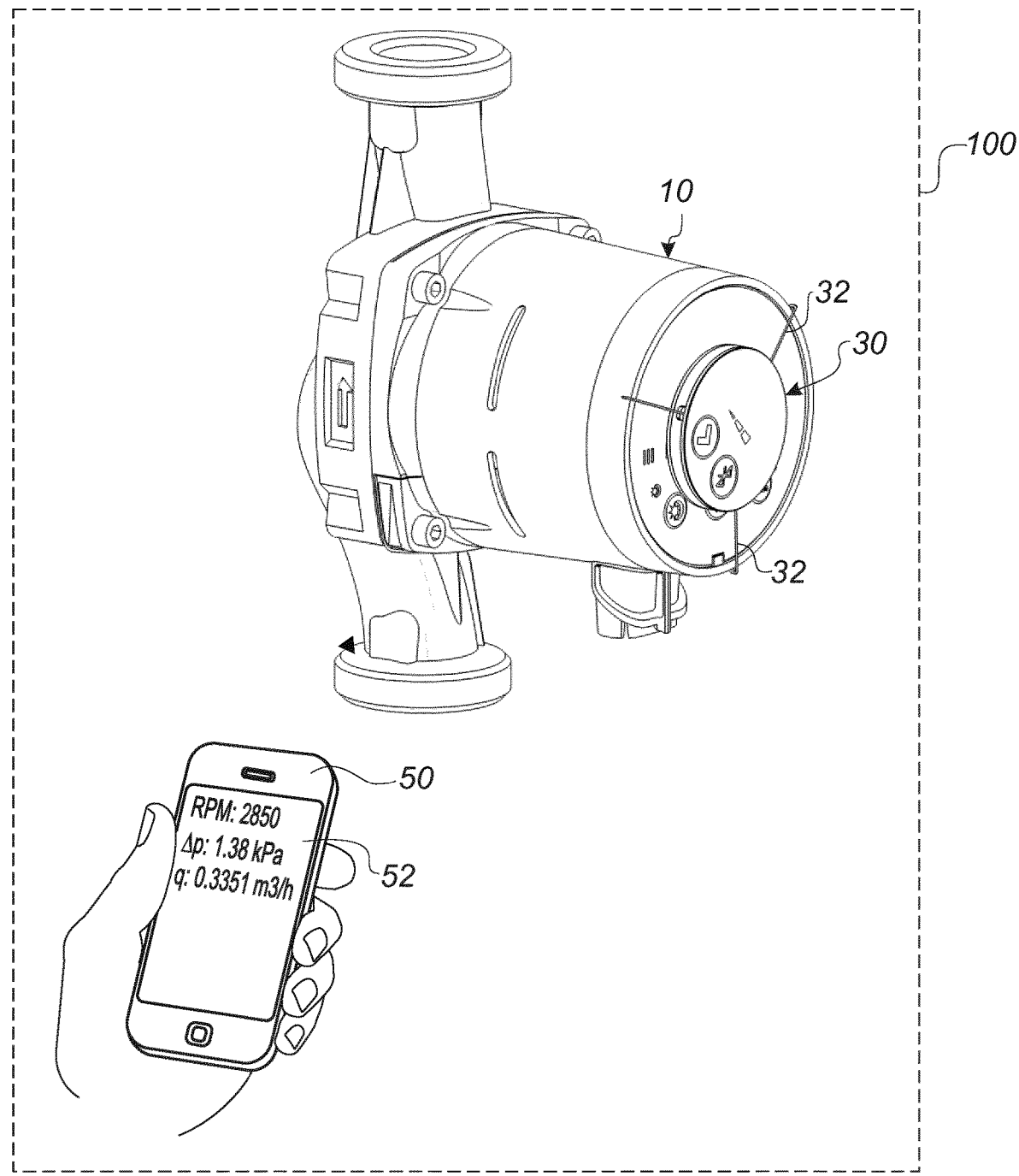
FIG. 4 shows a perspective view of the electronic converter unit retrofitted to an exterior part of a housing of the pump unit.

FIG. 4 shows a system 100 for checking the operating status of a pump unit 10. The system 10 comprises the afore-mentioned pump unit 10 and the electronic converter unit 30. The electronic converter unit 30 is here shown attached to the front end 14 of the housing 12 of the pump unit 10, such that the photo detector of the electronic converter unit 30 is aligned with the light source 18 of the pump unit 10. The electronic converter unit 10 is attached to the front end 14 of the pump unit 10 by use of mechanical fasteners 32, which are connected to sides of the housing 12 of the pump unit 10.

The electronic converter unit 10 detects the optical signals emitted from the pump unit 10 and converts them to radio signals, which are transmitted to an external communication unit 50 in form of a smart phone having a display 52. The smart phone 50 comprises an app, which is installed and running on the smart phone 50. The smart phone 50 and app are adapted to receive and process the radio signals sent from the electronic converter unit 30 so as to display the operating status of the pump unit 10 on the display 52 of the smart phone 50. The app may further be provided with a function to control the pump unit by setting the operating or drive parameters of the pump unit 10. The smart phone 50 may send the control instructions via the electronic converter unit 30.

FIGS. 5a-d shows an alternative design for an electronic converter unit 30' for use in the invention, where the electronic converter unit 30' is shaped as an elongated unit. The electronic converter unit 30' comprises the same features as the electronic converter unit shown in FIG. 3. Accordingly, only the differences between the two embodiments are described in the following. Similar to the embodiment of FIG. 3, the electronic converter unit 30' comprises a housing 31', which houses the electronic circuitry of the electronic converter unit 30'. A front end of the electronic converter unit 30' may further be provided with an indicator or display 34', e.g. for giving an indication of a signal strength of the measured optical signal emitted from the light source 18 of the pump unit 10. The display 34' may thus provide a visual feedback to a user providing information about the alignment of the photo detector relative to the light source 18 of the pump unit 10.

Figure 5A:
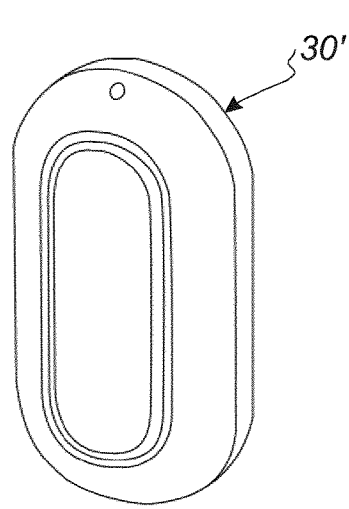
FIGS. 5a-d show different perspective view of a second embodiment of an electronic converter unit.
Figure 5B:
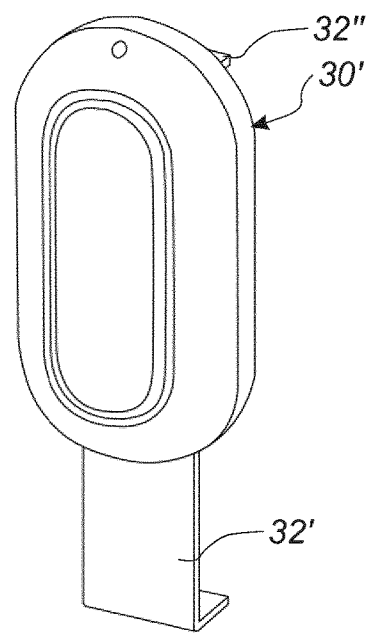
Figure 5C:
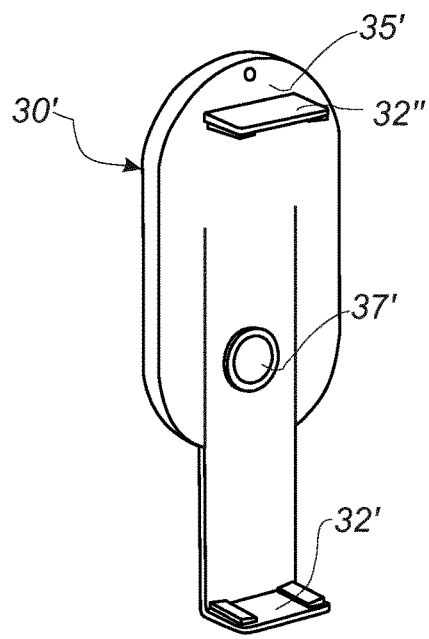

The electronic converter unit 30' comprises a first mechanical fastener 32', which is slidable engaged with a main part of the electronic converter unit and may be extended from a first end of the electronic converter unit 30'. The electronic converter unit 30' further comprises a second mechanical fastener 32" at a second end of the unit 30'. The distance between the two mechanical fasteners 32', 32" may be varied so that they can mechanical engage sides of the frontend of the pump unit 10. The electronic converter unit 30' may further be designed such that the first mechanical fastener 32', when arranged in a closed state, covers and protects an aperture (e.g. a window or a condensing lens) in front of a photo detector of the electronic converter unit, and so that the aperture is exposed, when the first mechanical fastener 32' extends from the main body of the unit 30' (as seen in FIG. 5c). The mechanical fasteners 32' and 32" may be provided with small rubber pads, placed in the area where they engage with the pump housing. In this way the electronic converter unit 30 is mechanically better fixated to the pump housing and accommodate the shape of the housing.

Figure 5D:
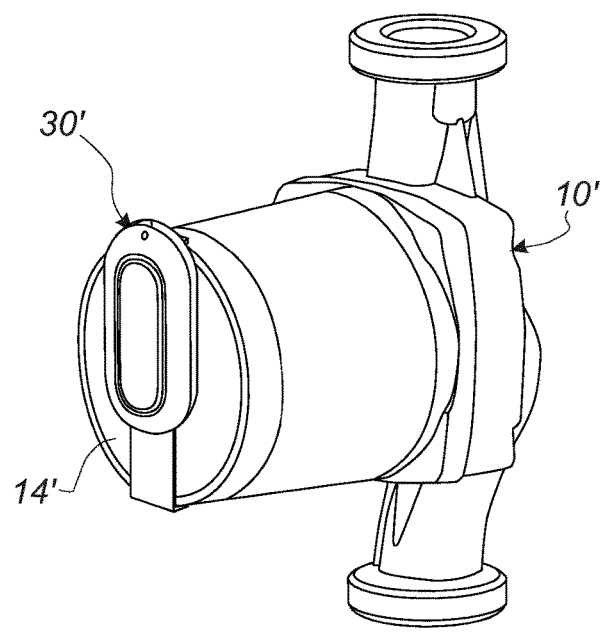

The electronic converter unit 30' may further be designed such that a small part 35' of the unit 30' protrudes beyond the housing of the pump unit 10, when the electronic converter unit 30' is arranged on the front end 14 of the pump unit, as shown in FIG. 5d. This may for instance be achieved by letting the second mechanical fastener 32" being spaced slightly from an end face of the unit 30'. An antenna may be arranged in the protruding part 35' of the electronic converter unit 30', which may in some instances provide a stronger signal to the handheld communication device.

In yet another embodiment the communication between the external communication device 50 and the pump unit 10 is done directly between the units, i.e. without the electronic converter unit 30. In a bidirectional communication mode, the pump unit incorporates means for communicating wirelessly with the external communication device, either via optical communication or, by way of example, via radio frequency frequency communication, Bluetooth®, GSM, CDMA, 3G or 4G. The pump unit incorporates in its internal software programme storage the instructions for balancing a heating system according to the invention, and the programme for calculating the design flows and hydraulic resistances of the heating system. The app has so to speak been moved from the external communication device into the pump unit.

FIG. 6 shows a flow chart that illustrates the overall steps carried out in a method according to the invention of balancing a heating system 150 as shown in FIG. 1a. In step A), measurements for determining the flow rate and the pressure difference are carried out for each of the heating elements $H_1$-$H_n$. The measurements may be input into an app running on a handheld communication device or they may be read into the app automatically via wireless communication with the pump 10 or sensors.

Based on at least some of the measurements, a hydraulic model for the heating system is calculated in step B). Using the hydraulic model calculated in step B) and the measurements of step A), a design flow for each of the heating elements is calculated in step C). Provided that the calculations do not give rise to any warnings, as explained in a later example, the operator or service technician may the adjust the balancing valves $V_1$-$V_n$ of the heating system 150 in order for the flow through the individual heating elements $H_1$-$H_n$ to meet the design flow.

In a final optional step E), optimum pump settings for the pump 10 may be calculated, and a pump curve of the pump 10 may be adjusted accordingly in order to lower the overall energy consumption of the pump 10 and the heating system 150, thereby lowering the carbon footprint of the heating system 150.

FIG. 7 shows a flow chart that breaks down step A) of FIG. 6 into substeps. In a first substep A1), the operator or service technician opens balancing valve $V_i$ and closes all other balancing valves $V_1$-$V_n$. If there is another type of regulating valve present in the line connected to the radiator, typically a thermostatic radiator valve, then this valve must be fully opened. In a second substep A2), the pressure differential op; and flow rate $q_i$ of the given flow setting are measured and entered into the app (either via input or automatic reading). This will typically be carried out with the pump running at its maximum rotational speed. The measurements may be carried out a predetermined time after balancing valve $V_i$ has been opened or until the measurement values have stabilised in order to ensure that the flow has stabilised. Depending on the heating system 150, this typically takes a few seconds to a few minutes. The operator then in a third substep A3) closes balancing valve $V_i$. The operator then moves onto balancing valve $V_{i+1}$. Substeps A1) to A3) are repeated for all the balancing valves $V_1$-$V_n$.

Figure 8:
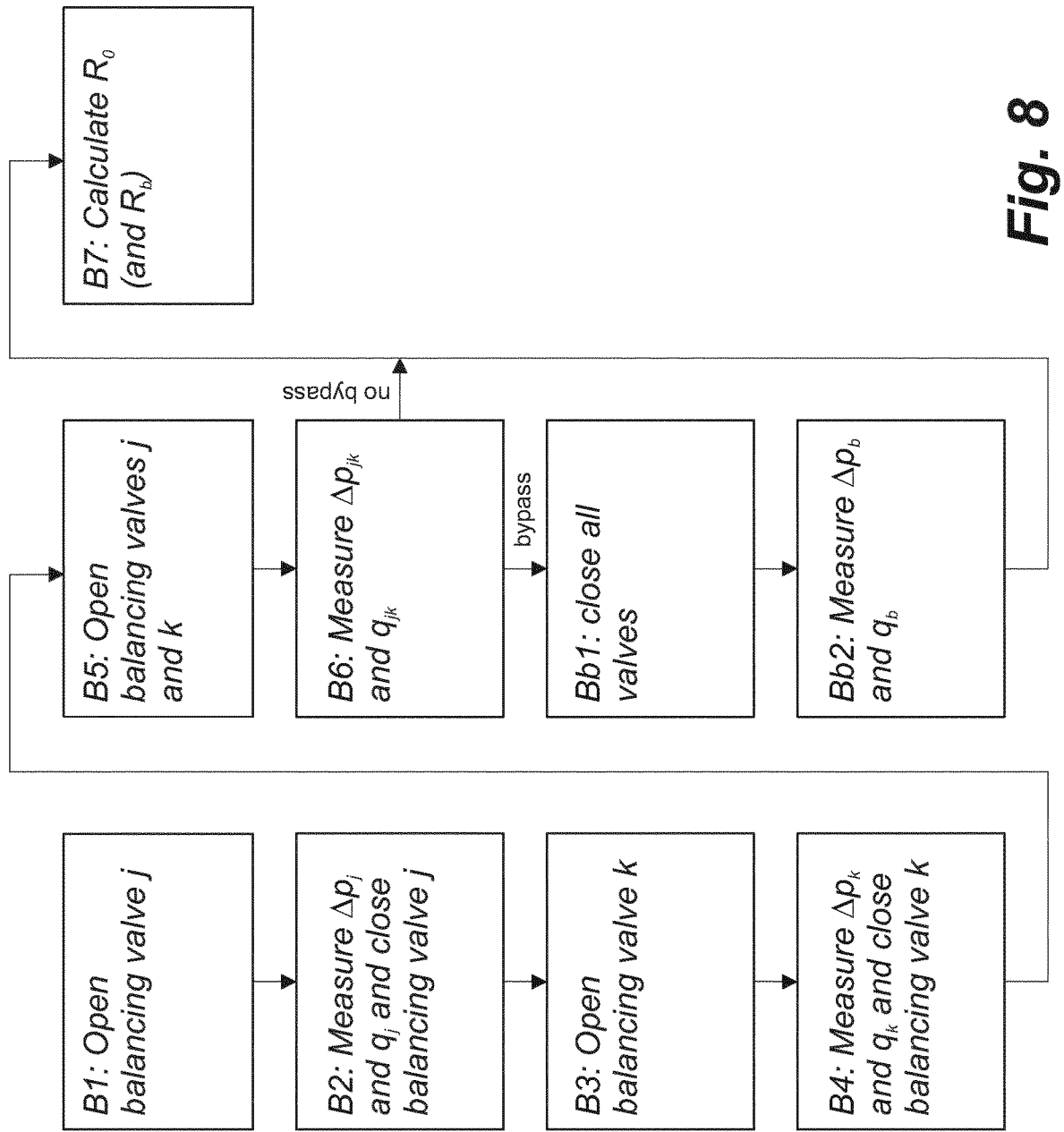

FIG. 8 shows a flow chart that breaks down step B) of FIG. 7 into substeps. In a first step B1), a service technician opens balancing valve $V_j$ and closes all other balancing valves $V_1$-$V_n$. In a second substep B2), the pressure differential op; and flow rate $q_j$ of the given flow setting are determined and entered into the app (either via input or automatic reading).

In a third step B3), or service technician opens balancing valve $V_k$ and closes all other balancing valves $V_1$-$V_n$. In a fourth substep B4), the pressure differential $\Delta p_k$ and flow rate $q_k$ of the given flow setting are determined and read into the app (either via input or automatic reading). Then in a fifth substep B5), both balancing valve $V_j$ and $V_k$ are opened, and in a sixth substep B6), the pressure differential $\Delta p_{jk}$ and flow rate $q_{jk}$ of the given flow setting are measured and read into the app.

If the heating system 150 does not have a bypass line, the method proceeds to substep B7), and calculates the hydraulic model including the hydraulic resistance $R_0$ of the boiler 55. If the heating system comprises a bypass line 65, two additional substeps Bb1) and Bb2) have to be carried out in order to calculate the hydraulic resistance $R_b$ of the bypass line 65. In the first additional substep Bb1), all balancing valves $V_1$-$V_n$ are closed, and in the second additional substep Bb2), the corresponding differential pressure $\Delta p_b$ and flow rate $q_b$ of the given flow setting are measured and read into the app.

It is recognised that substeps B1)-B4) corresponds to substeps A1)-A3). Accordingly, the measurements from step A) may also be used for calculating the hydraulic model. Further, it is clear that balancing valve $V_j$ and $V_k$ may be chosen arbitrarily in the system. It is also possible to use more than two valves for calculating the hydraulic model, in which case the variables of the hydraulic model may be verified and/or over-determined in order to obtain a higher statistical significance for the hydraulic model.

Figure 13:
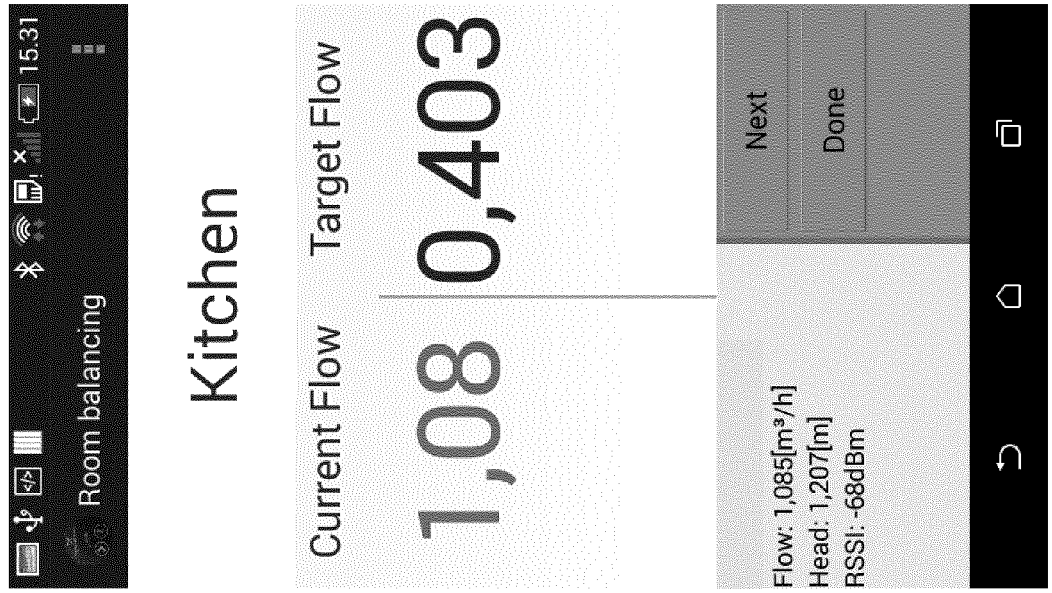
FIGS. 12 and 13 show examples of screens for an app utilised in a method according to the invention for balancing a heating system.
Figure 12:
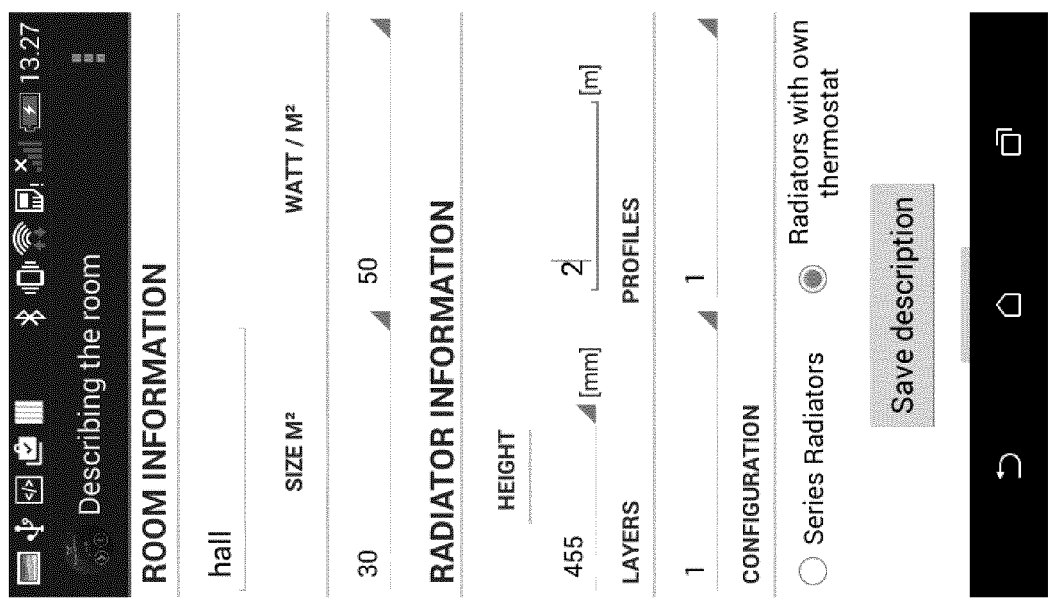

FIG. 9 shows a flow chart that breaks down steps C) and D) of FIG. 6 into substeps. In the first two substeps C1) and C2), the rooms or spaces to be heated as well as the heating elements $H_1$-$H_n$ of the heating system 150 are mapped. This may be carried out by inputting the area or volume of the room or space to be heated as well as the needed power per square meter to obtain a temperature equilibrium at room temperature, and the size of the heating elements, e.g. the total area of radiators use for heating the room or space. A further characteristic that may be entered is the kind of room, i.e. a living room, kitchen, bedroom, toilet or a hall. The characteristics may be mapped by inputting the values into an app on a smart phone or the like, e.g. as shown in FIG. 12. The power consumption or loss at temperature equilibrium of the room may also be calculated in substep C3). Based on the mapped values, the needed emission power or heat for the heating element may be calculated in substep C4), which in turn makes it possible to calculate the design flow, which is needed in order to achieve the required emission of heat from the heating element, as the heating fluid passes through the heating element. Finally, each of the balancing valves $V_1$-$V_n$ may be set in sequence so as to meet the design flow for each heating element $H_1$-$H_n$, e.g. by tracking the flow rate as the corresponding balancing valve is opened. This may also be carried out via the app, e.g. via a screen as shown in FIG. 13, which shows a concrete example about balancing a kitchen. During the balancing operation the current flow, e.g. an estimate of the actual flow, through the kitchen line is shown on the screen. The target flow, or desired value, as calculated by the app, which uses the hydraulic model with parameter values determined in step B) is also shown, and the operator is now adjusting the balancing valve to lower the flow rate through the line in order to meet the target flow. Once the target flow is equal to or close to the target flow the operator must press the "Done" button, and can via "Next" continue to balance the radiator in the next room. When all radiators have been balanced, a report is generated by the app, and the report can be accessed from the app or sent by email to relevant recipients.

After the different rooms and balancing valves $V_1$-$V_n$ have been balanced, it is further possible to adjust the settings of the pump in order to lower the pressure and flow overhead and thereby reducing the overall power consumption of the pump 10 and the heating system 150, cf. step E) of FIG. 6 and FIG. 10.

In a first substep E1), the optimum system pressure $\Delta p_s$ is found. This may be carried out by determining which hydraulic line that requires the highest pressure when calculating a required system pressure provided by the pump 10. Further, in substep E2), the total required flow at the design point is calculated. Based on the calculation of substep E1) and E2), the needed pump settings may in substep E3) be calculated based as a sum of the required system pressure $\Delta p_s$, a pressure loss of the boiler 55, and a given robustness factor of the heating system. The robustness factor may for instance be set to 0-15% of the required system pressure $\Delta p_s$. In a final substep E4, the pump curve of the pump 10 is adjusted according to the required settings at the design point.

The pump curve may for instance be adjusted such that the needed pressure and a reference pressure of the pump are coinciding with a proportional graph as shown in FIG. 11a. It may also be assumed that the needed pressure and the reference pressure are arranged on a constant value as shown in FIG. 11b, in which case the reference pressure is set equal to the needed pressure. Such adjustment is typically done by changing the rotational speed of the rotor and hence the impeller in the pump. Preferably, the invention can be implemented by using a centrifugal pump, which incorporates control electronics for regulating the rotational speed.

In the following, an example of how the various settings and parameter values may be calculated is given. However, it is recognised that it may be possible to use different equations in order to calculate the various settings for balancing the heating system 150.

EXAMPLE

In this example, we restrict ourselves to work with so-called two-string systems fed by one pump 10. A sketch of such a heating system 150 is shown in FIG. 1.

We define a well-balanced system as a system, where at the design load and design temperatures (e.g. −12° C. outdoor and 22° C. room temperature) the heat emitted from the heat emitters equals the heat losses of the rooms, also called the design point of the heating system. Under these conditions a fully opened valve should not lead to a higher flow than required to emit the heat that accommodates the heat losses. A higher flow is avoided by adjusting the balancing valves at each of the heat emitters as aforementioned described with relation to design flow and design point of the heating system.

Establish Hydraulic Model of the Heater

In order to calculate the hydraulic model of the heater, the steps shown in FIG. 8, e.g. for valve $V_1$ and $V_2$, whereby four sets of measurements $(\Delta p_1, q_1), \ldots, (\Delta p_4, q_4)$ are obtained, and which are used for calculating the internal hydraulic resistance $R_0$ in the heater and the bypass resistance $R_b$.

The internal boiler resistance $R_0$ can be found by solving the following equation:

$$0 = \frac{1}{\sqrt{\frac{\Delta p_2}{\sqrt{q_2}} - R_0}} + \frac{1}{\sqrt{\frac{\Delta p_3}{\sqrt{q_3}} - R_0}} - \frac{1}{\sqrt{\frac{\Delta p_1}{\sqrt{q_1}} - R_0}} - \frac{1}{\sqrt{\frac{\Delta p_4}{\sqrt{q_4}} - R_0}}$$

When $R_0$ has been calculated, the bypass resistance $R_b$ may then be calculated by:

$$R_b = \frac{\Delta p_1}{q_1^2} - R_0$$

When the resistances $R_0$ and $R_b$ have been calculated the pressure and flow in the heat distribution system is given by:

$$\Delta p_s = \Delta p - R_0 q^2$$
$$q_s = q - \frac{1}{\sqrt{R_b}} \sqrt{\Delta p - R_0 q^2}$$

This system pressure and flow rating is in the following used in the balancing calculation, as this corresponds to the flow through the heating elements and the pressure across the valve, radiator, and piping.

Measuring Flow and Calculating Design Flow

The strategy for establishing the real flow and the design flow for each radiator is the following:
  i. Measure the square meters of room i.
  ii. Measure the size of the radiator and enter the type of radiator j of the room.
  iii. Open valve $V_j$ and measure pressure and flow.
  iv. Close valve $V_j$ and go to valve j+1.
  v. If there are no more radiators go to room i+1.

These steps combined correspond to the steps shown in FIGS. 7 and 9, but it should be emphasised that i and j should not be confused with the use of i and j in the previous flow-charts (FIGS. 7 and 8).

First we consider the calculations that should be done for each of the rooms. The power consumption expected for the $i^{th}$ room $P_i$ is here defined as a pre-defined power per square meter $P_A$, and the area of the room $A_i$:

$$P_i = A_i P_A$$

However, other methods for calculating $P_i$ could be used as an alternative.

The power consumption of the room should be shared between the radiators of the given room in accordance with their size, such that for n radiators, the room power should split so that the $j^{th}$ radiator should deliver the power (D, given by:

$$\Phi_j = \frac{\overline{\Phi_j}}{\sum_{k=1}^{n} \overline{\Phi_k}} \cdot P_i$$

where $\overline{\Phi_k}$ is the design power of the n radiators in the particular room or space.

When the power of the $j^{th}$ radiator is known, the expected return temperature can be calculated using a simple radiator model:

$$T_r = 2\left(\frac{\Phi_j}{K_{rad}}\right)^{1/n} + 2T_a - T_s$$

where $K_{rad}$ defines the size of the given radiator, and may together with $\overline{\Phi_k}$ be found from look-up tables, $T_s$ is the defined supply temperature at the design conditions, $T_a$ is the expected room temperature, typically 22 degrees Celsius, and finally n=1.3 is a standard exponent for simple radiator models. When the return temperature is known, the flow can be calculated using the power equation for the supply flow:

$$\overline{q}_j = \frac{\Phi_j}{C_w(T_s - T_r)}$$

where $\overline{q}_j$ is the design flow for the given radiator and $C_w$ is a measure for the heat transfer.

For each of the hydraulic lines, also the system flow and pressure are calculated using the aforementioned equations for calculating $\Delta p_s$ and $q_s$. This means that for each radiator the following information is available $\{q_j, q_{s,j}, \Delta p_{s,j}\}$.

Calculate Flow References

When all radiator flows and pressures are measured, and the design flows for each radiator are established, the system is evaluated for the following:

Pump too small?: This is evaluated by checking if $\overline{q}_j > q_{s,j}$ for any of the design flows, meaning that the actual flow is smaller than the design flow. The pump is running on the maximum curve during the balancing. Therefore if $\overline{q}_j > q_{s,j}$, it is not possible to obtain the design flow with the given pump. The app running on the smart phone or tablet will inform the operator about this situation, and may suggest a suitable pump size.

Radiators too small?: This is evaluated by checking the difference between the supply and return temperature $(T_s, T_r)$, $\Delta T = T_s - T_r$. If this temperature is below a predefined threshold value, a warning should be given. This problem could be accommodated by either increasing the supply temperature or changing the radiator.

Return temperature too high?: This is evaluated by checking the calculated return temperature $T_r$. If the return temperature is above a predefined threshold, a warning should be given. This problem is closely related to the previous problem and should equally be accommodated by either increasing the supply temperature or changing the radiator.

Return temperature too low?: This is evaluated by checking the calculated return temperature $T_r$. If the return temperature is below a predefined threshold, a warning could be given. This is typically not creating problems for the heating system, but it could be an indicator that some of the numbers used for the calculation are not correct, such as the input room area A, power per square meter $P_A$, or the radiator size.

When the system is evaluated for design faults, it is possible to calculate the reference flows for each radiator, which should be used for the calibration. The reference flows depend on the system pressure $\Delta p_s$ provided by the pump. Therefore, the first step in the balancing procedure is to find the optimal system pressure. The hydraulic line that has the highest pressure requirement is the one, where the distance between the design flow $\overline{q}_j$ and the measured flow is the smallest:

$$d = \underset{j}{\arg\min}\{q_1 - \overline{q}_{s,1}; q_2 - \overline{q}_{s,2}, \ldots, q_n - \overline{q}_{s,n}\} \quad (13)$$

where d is the radiator that defines the pressure requirements. Note that if the system is evaluated to be OK, then $\overline{q}_j < q_{s,j}$, meaning that all terms in the above set of flow differences are positive. When the radiator with the highest pressure requirements is found the system pressure requirements $\Delta \overline{p}_s$ can be calculated:

$$\Delta \overline{p}_s = \left(\frac{\overline{q}_d}{q_{s,d}}\right)^2 \Delta p_{s,d} \quad (14)$$

where $\overline{q}_d$ is the design flow for the radiator with the highest pressure requirement.

The adjustment of the individual valve flows should be done at the maximum curve. Therefore, the design flow $q_j$ is scaled in dependence of $\Delta p_s$ and the actual measured pressure $\Delta p_{s,j}$:

$$q_{r,j} = \overline{q}_j \sqrt{\frac{\Delta p_{s,j}}{\Delta \overline{p}_s}} \quad (15)$$

The valves should be adjusted such that the actual flow $q_j$ equals the reference flow $q_{r,j}$.

Calculate Pump Settings

Finally to get the full benefit of the balancing, the pump pressure must be adjusted to the values used for the balance calculations. The expected pump flow q at the design point can be calculated from the separate valve design flows $q_j$ and the bypass flow:

$$q = \frac{1}{\sqrt{R_b}}\sqrt{\Delta \overline{p}_s} + \sum_{j=1}^{k} \overline{q}_j \quad (16)$$

where the first term on the right hand side is the bypass flow and the sum represents the valve flows, and wherein k is the number of valves connected to the heating system. When the pump flow at the design point is known, the pump pressure $\Delta p$ at the design pump can be calculated:

where the first term on the right is the design system pressure and the second term is the pressure loss in the heater. $\delta > 0$ is a robustness factor ensuring that the pressure is always higher than required.

When the design point for the pump is known, a proportional pressure curve (as shown in FIG. 11a) or a constant pressure curve (as shown in FIG. 11b), which contain the design point must be chosen. In FIG. 11a the proportional pressure curve is shown together with the design point (q; $\Delta p$), and in FIG. 11b the constant curve is shown together with the design point (q; $\Delta p$).

The invention has been described with reference to advantageous embodiments. However, the scope of the invention is not limited to the illustrated embodiments, and alterations and modifications can be carried out without deviating from the scope of the invention, which is defined by the following claims.

| Reference Numerals | |
|---|---|
| 10 | Pump/pump unit |
| 12 | Housing/terminal box |
| 14 | Front end/display |
| 16 | Display units |
| 18 | Light source/diode |
| 20, 21 | Pipe flanges |
| 22 | Frequency transformer |
| 24 | Control unit |
| 28 | Window |
| 29 | Light/Optical signal/optical data |
| 30, 30' | Electronic converter unit |
| 31 | Housing |
| 32, 32', 32" | Fasteners |
| 34 | Display/Indicator |
| 35' | Protruding part of electronic converter unit |
| 36 | Bluetooth |
| 37, 37' | Optical transparent layer |
| 50 | External communication device/smart phone |
| 52 | Display |
| 55 | Boiler/Heat source/Heater |
| 60 | Supply line |
| 65 | Bypass line |
| 70 | Return line |
| 100 | System for checking the operating status of a pump unit |
| 150 | Heating system |
| $\Delta p$ | Pressure difference across the pump |
| q | Flow rate through the pump |
| $H_i$ | Heating element no. i |
| $R_i$ | Flow/hydraulic resistance for loop line i or element i |
| $V_i$ | Balancing valve for heating element no. i |
| $W_i$ | Adjustment valve for heating element no. i |
| $\Delta p_s$ | System pressure |
| $q_s$ | Flow rate in the system |
| $R_0$ | Hydraulic resistance of the heat source |
| $R_b$ | Hydraulic resistance of the bypass line |
| $L_i$ | Hydraulic line/loop no. i |

The invention claimed is:

1. A method of balancing a heating system, wherein the heating system comprises:
   a flow system comprising a supply flow line and a return flow line,
   a heat source and at least a first pump coupled to the flow system and pumping fluid through the heat source to the flow system, and
   a plurality of hydraulic lines between the supply flow line and the return flow line, at least two of which have a heating element with a dedicated balancing valve, wherein the method comprises the steps of:
   A) carrying out one or more measurements for each of the hydraulic lines by opening one hydraulic line only and determining a flow rate through the pump and a pressure difference across the pump,
   wherein said one more measurements is carried out by the following steps:
      opening a first dedicated balancing valve and closing the remainder of the plurality of dedicated balancing valves in order to set a first flow setting for the flow system,
      measuring a pressure difference and flow rate for the first flow setting;
      opening a second dedicated balancing valve and closing the remainder of the plurality of balancing valves in order to set a second flow setting for the flow system;
      measuring a pressure difference and a flow rate for the second flow setting; and further carrying out at least one additional measurement for at least two hydraulic lines by opening the first and the second dedicated balancing valve in order to set a third flow setting for the flow system;
   B) establishing a hydraulic model for the heating system based on the determined flow rate and pressure difference from measurements of at least two of the hydraulic lines in the first and the second flow setting from step A), and said at least one additional measurement for at least two hydraulic lines in the third flow setting, from step A), that are open at the same time, wherein the measurement of steps A) are utilized to determine the hydraulic resistances of the heat source and the hydraulic resistance of the hydraulic lines;

C) specifying a desired flow rate for each of the hydraulic lines, which is needed in order to achieve a required emission of heat from the heating elements as a heating fluid passes through the heating element; and D) adjusting one or more of the dedicated balancing valves in order to meet the desired flow rate for each of the hydraulic lines by using the hydraulic model.

2. A method according to claim 1, wherein the hydraulic model is utilized to calculate a flow rate through the heating system, and wherein said flow rate through the heating system is compared to the desired flow rate for each of the hydraulic lines in order to adjust the one or more of the dedicated balancing valves in step D).

3. A method according to claim 1, wherein step B) further comprises the additional step of closing all the balancing valves in order to set a bypass flow setting and carrying out a measurement in order to determine a pressure difference and a flow rate for the bypass flow setting, and wherein step B) is also determined based on the measurement from said additional step.

4. A method according to claim 3, wherein the hydraulic model at least comprises a calculation of a hydraulic resistance of a bypass line of the heating system.

5. A method according to claim 2, wherein the step for establishing a hydraulic model of the heating system is carried out for different sets of two heating elements and dedicated balancing valves.

6. A method according to claim 1, wherein the step for calculating the desired flow rate for the individual heating elements is based on a size of a space of which the individual heating element is to heat.

7. A method according to claim 1, wherein the step for calculating the desired flow rate for the individual heating elements is based on a size of said heating element.

8. A method according to claim 1, wherein a warning is generated, if the desired flow rate of one of the individual heating elements is higher than a maximum flow rate of the system.

9. A method according to claim 1, wherein a warning is generated, if a difference between a supply temperature and a return temperature of an individual heating element is lower than a predefined threshold, alternatively that the return temperature is higher than a predefined threshold.

10. A method according to claim 1, wherein a warning is generated, if a calculated return temperature is lower than a predefined threshold.

11. A method according to claim 1, wherein the method further comprises the step of determining which dedicated balancing valve requires a highest pressure, and wherein a required system pressure provided by the pump is subsequently calculated based on said dedicated balancing valve.

12. A method according to claim 1, wherein the method further comprises the additional step of calculating required pump settings and adjusting the pump speed to meet the required pump settings plus a given robustness factor.

13. A method according to claim 12, wherein the method of calculating the required pump settings comprises the step of calculating a required pump flow at a design point of the system.

14. A method according to claim 13, wherein the required pump flow is calculated as a sum of the desired flow rates of the individual hydraulic lines.

15. A method according to claim 11, further comprises the additional step of calculating required pump settings and adjusting the pump speed to meet the required pump settings plus a given robustness factor wherein a required pump pressure of the pump is calculated as a sum of a required system pressure, a calculated pressure loss of the heat source, and the robustness factor, wherein said calculated pressure loss is calculated based on the hydraulic model.

16. A method according to claim 15, wherein a pump curve of the pump is set based on the required pump pressure of the pump.

17. A method according to claim 1, wherein the pressure and the flow rating are determined from measurements by one or more sensors.

18. A method according to claim 1, wherein at least one of the steps is carried out by use of a handheld communication device running an app or via an app implemented in the pump.

19. A device for a pump, the device comprising:
means for communicating with a handheld communication device, where the pump is further adapted to:
calculate a hydraulic model for use in balancing heating elements of a heating system comprising a flow system comprising a supply flow line and a return flow line, a heat source, wherein the pump is coupled to the flow system for pumping fluid through the heat source to the flow system, and a plurality of hydraulic lines between the supply flow line and the return flow line, at least two of which have a heating element with a dedicated balancing valve, wherein one or more measurements are carried out for each of the hydraulic lines by opening one hydraulic line only and determining a flow rate through the pump and a pressure difference across the pump and a hydraulic model is established for the heating system based on the determined flow rate and pressure difference from at least two measurements of at least two of the hydraulic lines and at least one additional measurement for at least two hydraulic lines that are open at the same time, wherein the one or more measurements are utilized to determine hydraulic resistances of the heat source and a hydraulic resistance of the hydraulic lines, wherein the one more measurements is carried out by the following steps:
opening a first dedicated balancing valve and closing the remainder of the plurality of dedicated balancing valves in order to set a first flow setting for the flow system,
measuring a pressure difference and flow rate for the first flow setting;
opening a second dedicated balancing valve and closing the remainder of the plurality of balancing valves in order to set a second flow setting for the flow system;
measuring a pressure difference and a flow rate for the second flow setting; and
carrying out at least one additional measurement for at least two hydraulic lines by opening the first and the second dedicated balancing valve in order to set a third flow setting for the flow system;
specify a desired flow rate for each of the hydraulic lines, which is needed in order to achieve a required emission of heat from the heating elements as a heating fluid passes through the heating element; and signal an adjustment of one or more of the dedicated balancing valves to meet the specified desired flow rate for each of the hydraulic lines by using the hydraulic model.

20. A handheld communication device running an app for balancing a heating system, wherein the heating system comprises a flow system comprising a supply flow line and a return flow line, a heat source and at least a first pump coupled to the flow system and pumping fluid through the heat source to the flow system, and a plurality of hydraulic lines between the supply flow line and the return flow line, at least two of which have a heating element with a dedicated balancing valve, wherein—the app is adapted to receive input about pressure differences and flow rates measured at different settings of the dedicated balancing valves, and wherein—the app is adapted to calculate a hydraulic model for the heating system based on the input, and—the app is adapted to calculate and display in the handheld communication device a desired flow for each of the balancing based on the input as well as the calculated hydraulic model wherein one or more measurements are carried for each of the hydraulic lines by opening one hydraulic line only and determining a flow rate through the pump and a pressure difference across the pump and a hydraulic model is established for the heating system based on the determined flow rate and pressure difference from at least two measurements of at least two of the hydraulic lines and at least one additional measurement for at least two hydraulic lines that are open at the same time, wherein the one more measurements is carried out by opening a first dedicated balancing valve and closing the remainder of the plurality of dedicated balancing valves in order to set a first flow setting for the flow system, measuring a pressure difference and flow rate for the first flow setting, opening a second dedicated balancing valve and closing the remainder of the plurality of balancing valves in order to set a second flow setting for the flow system, measuring a pressure difference and a flow rate for the second flow setting and further carrying out at least one additional measurement for at least two hydraulic lines by opening the first and the second dedicated balancing valve in order to set a third flow setting for the flow system, the handheld communication device running an app is configured to:
  calculate a hydraulic model based on the determined flow rate and pressure difference from the one line only measurements of at least two of the hydraulic lines and from the at least one additional measurement for at least two hydraulic lines, wherein the one or more measurements are utilized to determine hydraulic resistances of the heat source and a hydraulic resistance of the hydraulic lines;
  specify a desired flow rate for each of the hydraulic lines, which is needed in order to achieve a required emission of heat from the heating elements as a heating fluid passes through the heating element; and
  indicate an adjustment of one or more of the dedicated balancing valves to meet the specified desired flow rate for each of the hydraulic lines by using the hydraulic model.

21. A handheld communication device according to claim 20, wherein the app is further adapted to receive additional input about the number of heating elements and information about spaces to be heated by the heating system, and where the app is adapted to calculate the desired flows based on said additional input, based on weighting functions.

22. A handheld communication device according to claim 20, wherein the app further provides a guide to a user or operator instructing the user on a sequence for opening and closing balancing valves of the heating system and carrying out measurements.

23. A balancing system comprising:
  a heating system comprising:
    a flow system comprising a supply flow line and a return flow line;
    a heat source and at least a first pump coupled to the flow system and pumping fluid through the heat source to the flow system; and
    a plurality of hydraulic lines between the supply flow line and the return flow line, at least two of which have a heating element with a dedicated balancing valve, wherein one or more measurements are carried for each of the hydraulic lines by opening one hydraulic line only and determining a flow rate through the pump and a pressure difference across the pump and a hydraulic model is established for the heating system based on the determined flow rate and pressure difference from at least two measurements of at least two of the hydraulic lines and at least one additional measurement for at least two hydraulic lines that are open at the same time, wherein the one or more measurements are utilized to determine hydraulic resistances of the heat source and a hydraulic resistance of the hydraulic lines, wherein the one more measurements is carried out by the following steps:
      opening a first dedicated balancing valve and closing the remainder of the plurality of dedicated balancing valves in order to set a first flow setting for the flow system,
      measuring a pressure difference and flow rate for the first flow setting;
      opening a second dedicated balancing valve and closing the remainder of the plurality of balancing valves in order to set a second flow setting for the flow system;
      measuring a pressure difference and a flow rate for the second flow setting; and
      carrying out at least one additional measurement for at least two hydraulic lines by opening the first and the second dedicated balancing valve in order to set a third flow setting for the flow system; and
  a handheld communication device comprising an app for balancing a heating system wherein:
    the app is adapted to receive input of the determined flow rate and pressure difference from the one line only measurements of at least two of the hydraulic lines and from the at least one additional measurement for at least two hydraulic lines;
    the app is adapted to calculate a hydraulic model for the heating system based on the input;
    the app is adapted to calculate and display in the handheld communication device a desired flow for each of the balancing based on the input as well as the calculated hydraulic model, wherein the desired flow rate is needed in order to achieve a required emission of heat from the heating elements as a heating fluid passes through the heating element; and
    the app is adapted to indicate an adjustment of one or more of the dedicated balancing valves to meet the specified desired flow rate for each of the hydraulic lines by using the hydraulic model.

24. A balancing system according to claim 23, wherein the handheld communication device and pump of the heating system are adapted to wirelessly communicate with each other.

25. A balancing system according to claim 24, wherein the handheld communication device and pump of the heating system are adapted to wirelessly communicate with each other via an electronic converter unit, which is adapted to read an output from the pump, and which electronic converter unit further is provided with a transmitter for transmitting electrical signals indicative of the output from the pump to the handheld communication device.

26. A balancing system according to claim 23, wherein the pump includes a housing, which comprises a signal source for emitting a signal, and wherein the electronic converter unit comprises:
   a signal detector for measuring the signal emitted from the signal source of the pump, and wherein the electronic converter unit is adapted to be detachably connected to the pump unit and in that the electronic converter unit further comprises:
   a converter unit for converting said signal to electrical signals, and
   transmitting means for transmitting the electrical signals to the handheld communication device.

27. A balancing system according to claim 23, wherein the settings of the pump may be set from the handheld communication device.

28. A balancing system according to claim 23, wherein at least a number of the plurality of balancing valves are electronic valves, which may be set via the app.

29. A balancing system according to claim 23, wherein at least a number of the plurality of heating elements also have a regulation valve, which may be manually set by a user of the heating system.

* * * * *